US010133729B2

United States Patent
(12) United States Patent
He et al.

(10) Patent No.: US 10,133,729 B2
(45) Date of Patent: Nov. 20, 2018

(54) SEMANTICALLY-RELEVANT DISCOVERY OF SOLUTIONS

(71) Applicant: Microsoft Technology Licensing, LLC, Redmond, WA (US)

(72) Inventors: Xiaodong He, Sammamish, WA (US); Jianfeng Gao, Woodinville, WA (US); Hamid Palangi, Vancouver (CA); Xinying Song, Bellevue, WA (US); Yelong Shen, Bothell, WA (US); Li Deng, Redmond, WA (US); Jianshu Chen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 222 days.

(21) Appl. No.: 14/839,281

(22) Filed: Aug. 28, 2015

(65) Prior Publication Data

US 2017/0060844 A1 Mar. 2, 2017

(51) Int. Cl.

| | |
|---|---|
| ***G06F 17/27*** | (2006.01) |
| ***G06F 17/30*** | (2006.01) |
| ***G06N 3/04*** | (2006.01) |

(52) U.S. Cl.

CPC .... *G06F 17/2785* (2013.01); *G06F 17/30654* (2013.01); *G06F 17/30657* (2013.01); *G06N 3/0445* (2013.01)

(58) Field of Classification Search

CPC ....................... G06F 17/2785; G06F 17/30654
USPC .............................................................. 704/9
See application file for complete search history.

(56) References Cited

U.S. PATENT DOCUMENTS

| | | | |
|---|---|---|---|
| 8,775,341 B1 | 7/2014 | Commons | |
| 9,098,532 B2 | 8/2015 | Cragun et al. | |
| 9,263,036 B1 * | 2/2016 | Graves | G10L 15/16 |
| 2009/0076797 A1 | 3/2009 | Yu | |
| 2009/0089047 A1 * | 4/2009 | Pell | G06F 17/2785 704/9 |

(Continued)

OTHER PUBLICATIONS

Optimizing search engines using clickthrough dat by Thorstein Joachimes Cornell University, copyright 2002.*

(Continued)

*Primary Examiner* — Bharatkumar S Shah
(74) *Attorney, Agent, or Firm* — Schwegman Lundberg & Woessner, P.A.

(57) ABSTRACT

Systems, methods, and computer-readable media for providing semantically-relevant discovery of solutions are described herein. In some examples, a computing device can receive an input, such as a query. The computing device can process each word of the input sequentially to determine a semantic representation of the input. Techniques and technologies described herein determine a response to the input, such as an answer, based on the semantic representation of the input matching a semantic representation of the response. An output including one or more relevant responses to the request can then be provided to the requestor. Example techniques described herein can apply machine learning to train a model with click-through data to provide semantically-relevant discovery of solutions. Example techniques described herein can apply recurrent neural networks (RNN) and/or long short term memory (LSTM) cells in the machine learning model.

18 Claims, 9 Drawing Sheets

(56) References Cited

U.S. PATENT DOCUMENTS

| | | | | |
|---|---|---|---|---|
| 2009/0164435 | A1* | 6/2009 | Routt | B82Y 10/00 |
| 2009/0204605 | A1* | 8/2009 | Bai | G06F 17/30654 |
| 2013/0159320 | A1* | 6/2013 | Gao | G06F 17/30867 707/748 |
| 2014/0114643 | A1 | 4/2014 | Baker et al. | |
| 2014/0337044 | A1* | 11/2014 | Heinze | G06Q 50/22 705/2 |
| 2015/0074027 | A1 | 3/2015 | Huang et al. | |
| 2017/0061250 | A1 | 3/2017 | Gao et al. | |

OTHER PUBLICATIONS

Banerjee et al., "METEOR: An Automatic Metric for MT Evaluation with Improved Correlation with Human Judgments," In Proceedings of ACL Workshop on Intrinsic and Extrinsic Evaluation Measures for Machine Translation and/or Summarization, Jun. 2005, pp. 65-72, 8 pages.

Barnard et al., "Learning the Semantics of Words and Picture," In Proceedings of International Conference of Computer Vision, Jul. 7, 2001, 8 pages.

Bengio et al., "Advances in Optimizing Recurrent Networks," published May 26, 2013, In Proceedings of IEEE International Conference on Acoustics, Speech and Signal Processing, 5 pages.

Berger et al., "A Maximum Entropy Approach to Natural Language Processing", In Journal of Computational Linguistics, vol. 22, No. 1, Mar. 1, 1996, pp. 39-71, 34 pages.

Carlson et al., "Toward an Architecture for Never-Ending Language Learning," In Proceedings of Twenty-Fourth AAAI Conference on Artificial Intelligence, Jul. 11, 2010, 8 pages.

Celikyilmaz et al., "Enriching Word Embeddings Using Knowledge Graph for Semantic Tagging in Conversational Dialog Systems," published Jan. 19, 2015, In Proceedings of Association for the Advancement of Artificial Intelligence, 4 pages.

Chen et al., "A Primal-Dual Method for Training Recurrent Neural Networks Constrained by the Echo-State Property," published Apr. 14, 2014, In Proceedings of International Conference on Learning Representations, 17 pages.

Chen et al., "Learning a Recurrent Visual Representation for Image Caption Generation," In Proceedings of the Computing Research Repository, Nov. 2014, 2 pages.

Chen et al., "Microsoft COCO Captions: Data Collection and Evaluation Server," In Journal of Computing Research Repository, Apr. 2015, 7 pages.

Chen et al., "Mind's Eye: A Recurrent Visual Representation for Image Caption Generation," In Proceedings of IEEE Conference on Computer Vision and Pattern Recognition, Retrieved on: May 19, 2015, 10 pages.

Chen et al., "NEIL: Extracting Visual Knowledge from Web Data," In Proceedings of IEEE International Conference on Computer Vision, Dec. 1, 2013, pp. 1409-1416, 8 pages.

Chintala, "Understanding Natural Language with Deep Neural Networks Using Torch," published Mar. 3, 2015, In Proceedings of Natural Language Processing, 13 pages.

Dahl et al., "Context-Dependent Pre-trained Deep Neural Networks for Large Vocabulary Speech Recognition," published Jan. 2012, In Journal of IEEE Transactions on Audio, Speech, and Language Processing, vol. 20, No. 1, 13 pages.

Dahl et al., "Large Vocabulary Continuous Speech Recognition with Context-Dependent DBN-HMMS," published May 22, 2011, In Proceedings of IEEE International Conference on Acoustics, Speech and Signal Processing, 4 pages.

Deng et al., "Analysis of Correlation Structure for a Neural Predictive Model with Application to Speech Recognition," published Feb. 1994, In Journal of Neural Networks, vol. 7, Issue 2, 2 pages.

Deng et al., "ImageNet: A Large-Scale Hierarchical Image Database," In Proceedings of IEEE Conference on Computer Vision and Pattern Recognition, Jun. 20, 2009, 8 pages.

Deng et al., "Scalable Stacking and Learning for Building Deep Architectures," published Mar. 25, 2012, In of IEEE Conference International Conference on Acoustics, Speech and Signal Processing, 4 pages.

Deng et al., "Sequence Classification using the High-Level Features extracted from Deep Neural Networks," published May 4, 2014, In Proceedings of IEEE International Conference on Acoustics, Speech and Signal Processing, 4 pages.

Divvala et al., "Learning Everything about Anything: Webly-Supervised Visual Concept Learning," In Proceedings of IEEE Conference on Computer Vision and Pattern Recognition, Jun. 24, 2014, 8 pages.

Donahue et al., "Long-term Recurrent Convolutional Networks for Visual Recognition and Description," In Proceedings of IEEE Conference on Computer Vision and Pattern Recognition, Retrieved on: May 19, 2015, 13 pages.

Elliott et al., "Comparing Automatic Evaluation Measures for Image Description," In Proceedings of 52nd Annual Meeting of the Association for Computational Linguistics, Jun. 23, 2014, pp. 452-457, 6 pages.

Elman, "Finding Structure in Time," published Mar. 1990, In Journal of Cognitive Science, vol. 14, Issue 2, 33 pages.

Everingham et al., "The Pascal Visual Object Classes (VOC) Challenge," In International Journal of Computer Vision, vol. 88, Issue 2, Jun. 2010, pp. 303-338, 36 pages.

Fang et al., "From Captions to Visual Concepts and Back," In Proceedings of Computer Vision and Pattern Recognition, Retrieved on: May 19, 2015, 10 pages.

Farhadi et al., "Every Picture Tells a Story: Generating Sentences from Images," In Proceedings of 11th European Conference on Computer Vision, Part IV, Sep. 5, 2010, 14 pages.

Frinken et al., "A Novel Word Spotting Method Based on Recurrent Neural Networks," published Jun. 9, 2011, In Proceedings of IEEE Transactions on Pattern Analysis and Machine Intelligence, vol. 34, Issue 2, 14 pages.

Frome et al., "DeViSE: A Deep Visual-Semantic Embedding Model," In Proceedings of Advances in Neural Information Processing Systems, Dec. 5, 2013, 9 pages.

Gao et al., "Clickthrough-Based Latent Semantic Models for Web Search," published Jul. 24, 2011, In Proceedings of the 34th international ACM SIGIR conference on Research and development in Information Retrieval, 10 pages.

Gao et al., "Clickthrough-Based Translation Models for Web Search: from Word Models to Phrase Models," published Oct. 26, 2010, In Proceedings of the 19th ACM international conference on Information and knowledge management, 10 pages.

Gao et al., "Learning Continuous Phrase Representations for Translation Modeling," published Jun. 22, 2014, In Proceedings of the 52nd Annual Meeting of the Association for Computational Linguistics, 11 pages.

Gao et al., "Modeling Interestingness with Deep Neural Networks," published Oct. 25, 2014, In Proceedings of the Conference on Empirical Methods in Natural Language Processing, 12 pages.

Gao et al., "Smoothing Clickthrough data for Web Search Ranking," published Jul. 19, 2009, In Proceedings of the 32nd international ACM SIGIR conference on Research and development in information retrieval, 8 pages.

Gers et al., "Learning Precise Timing with LSTM Recurrent Networks," published Mar. 1, 2003, In Journal of Machine Learning Research, vol. 3, 29 pages.

Gers et al., "Learning to forget: Continual Prediction with LSTM," published Sep. 7, 1999, In Proceedings of Ninth International Conference on Artificial Neural Networks, vol. 2, 6 pages.

Girshick et al., "Rich Feature Hierarchies for Accurate Object Detection and Semantic Segmentation," In Proceedings of IEEE Conference on Computer Vision and Pattern Recognition, Jun. 24, 2014, 21 pages.

Gkioxari et al., "Using k-Poselets for Detecting People and Localizing their Keypoints," In Proceedings of IEEE Conference on Computer Vision and Pattern Recognition, Jun. 24, 2014, 8 pages.

Gonzalez-Dominguez et al., "Automatic Language Identification using Long Short-Term Memory Recurrent Neural Networks,"

(56) References Cited

OTHER PUBLICATIONS published Sep. 14, 2014, In Proceedings of 15th Annual Conference of the International Speech Communication Association, 5 pages.
Graves et al., "Connectionist Temporal Classification: Labelling Unsegmented Sequence Data with Recurrent Neural Networks," published Jun. 25, 2006, In Proceedings of the 23rd International Conference on Machine Learning, 8 pages.
Graves et al., "Hybrid Speech Recognition With Deep Bidirectional LSTM," published Dec. 8, 2013, In Proceedings of IEEE Workshop on Automatic Speech Recognition and Understanding, 6 pages.
Graves, "Sequence Transduction with Recurrent Neural Networks," published Nov. 11, 2012, In Proceedings of Computing Repository Research, 9 pages.
Graves et al., "Speech Recognition with Deep Recurrent Neural Networks," published May 26, 2013, In Proceedings of IEEE International Conference on Acoustics, Speech and Signal Processing, 5 pages.
He et al., "Deep Learning for Natural Language Processing and Related Applications," published May 2015, In Proceedings of IEEE International Conference on Acoustics, Speech, and Signal Processing, 146 pages.
He et al., "Joint Learning of Distributed Representations for Images and Texts," In Proceedings of the Computing Research Repository, Apr. 2015, 8 pages.
Hinton et al., "Deep Neural Networks for Acoustic Modeling in Speech Recognition: the Shared Views of Four Research Groups," published Nov. 2012, In IEEE Signal Processing Magazine, vol. 29, Issue 6, 27 pages.
Hochreiter et al., "Long Short-Term Memory," published Nov. 1997, In Journal of Neural Computation, vol. 9, Issue 8, 32 pages.
Hodosh et al., "Framing Image Description as a Ranking Task: Data, Models and Evaluation Metrics," In Journal of Artificial Intelligence Research, vol. 47, Aug. 2013, pp. 853-899, 47 pages.
Hofmann, "Probabilistic Latent Semantic Analysis," published Jul. 30, 1999, In Proceedings of the Fifteenth Conference on Uncertainty in Artificial Intelligence, 8 pages.
Huang et al., "Learning Deep Structured Semantic Models for Web Search using clickthrough Data," In Proceedings of the 22nd ACM international conference on Conference on information & knowledge management, Oct. 27, 2013, pp. 2333-2338, 6 pages.
Huang et al., "Learning Deep Structured Semantic Models for Web Search Using Clickthrough Data," published Oct. 27, 2013, In Proceedings of the 22nd ACM international conference on Conference on information & knowledge management, 8 pages.
Iyyer et al., "Generating Sentences from Semantic Vector Space Representations," In Proceedings of Advances in Neural Information Processing Systems, Dec. 8, 2014, 5 pages.
Jadhav et al., "Automatic Caption Generation for News Images," In International Journal of Computer Science and Information Technologies, vol. 5, Issue 2, Mar. 2014, 3 pages.
Jarvelin et al., "IR Evaluation Methods for Retrieving Highly Relevant Documents," published Jul. 1, 2000, In Proceedings of the 23rd annual international ACM SIGIR conference on Research and development in information retrieval, 9 pages.
Jia et al., "Caffe: Convolutional Architecture for Fast Feature Embedding," In Proceedings of the ACM International Conference on Multimedia, Nov. 3, 2014, 4 pages.
Karpathy et al., "Deep Fragment Embeddings for Bidirectional Image Sentence Mapping," In Proceedings of Computing Repository Research, Jun. 2014, 9 pages.
Karpathy et al., "Deep Visual-Semantic Alignments for Generating Image Descriptions," In Proceedings of Computing Repository Research, Retrieved on: May 18, 2015, 17 pages.
Kiros et al., "Multimodal Neural Language Models," In Proceedings of NIPS Deep Learning Workshop, Dec. 9, 2013, 9 pages.
Kiros et al., "Unifying Visual-Semantic Embeddings with Multimodal Neural Language Models," published Nov. 2014, In Proceedings of the Computing Research Repository, 13 pages.
Krizhevsky et al., "ImageNet Classification with Deep Convolutional Neural Networks," In Proceedings of 26th Annual Conference on Neural Information Processing Systems, Dec. 3, 2012, 9 pages.
Kulkarni et al., "Baby talk: Understanding and Generating Simple Image Descriptions," In Proceedings of IEEE Computer Vision and Pattern Recognition, Jun. 20, 2011, pp. 1601-1608, 8 pages.
Kuznetsova et al., "Collective Generation of Natural Image Descriptions", In Proceedings of the 50th Annual Meeting of the Association for Computational Linguistics: Long Papers—vol. 1, Jul. 8, 2012, pp. 359-368, 10 pages.
Lau et al., "Trigger-Based Language Models: A Maximum Entropy Approach," In Proceedings of IEEE International Conference on Acoustics, Speech, and Signal Processing: speech processing—vol. 2, Apr. 27, 1993, 4 pages.
Lavrenko et al., "A Model for Learning the Semantics of Pictures," In Proceedings of Neural Information Processing Systems , Dec. 8, 2003, 8 pages.
Le et al., "Distributed Representations of Sentences and Documents," published Jun. 21, 2014, In Proceedings of the 31st International Conference on Machine Learning, vol. 32, 9 pages.
Lebret et al., "Phrase-Based Image Captioning," In Proceedings of Computing Repository Research, Feb. 2015, 9 pages.
Li et al., "Composing Simple Image Descriptions using web-scale n-grams," In Proceedings of the Fifteenth Conference on Computational Natural Language Learning, Jun. 23, 2011, pp. 220-228, 9 pages.
Lin et al., "Automatic Evaluation of Machine Translation Quality Using Longest Common Subsequence and Skip-Bigram Statistics," In Proceedings of the 42nd Annual Meeting on Association for Computational Linguistics, Jul. 21, 2004, 8 pages.
Lin et al., "Microsoft COCO: Common Objects in Context," In Proceedings of 13th European Conference on Computer Vision Part V, Sep. 6, 2014, 16 pages.
Maas et. al., "Learning Word Vectors for Sentiment Analysis," In Proceedings of the 49th Annual Meeting of the Association for Computational Linguistics: Human Language Technologies, Jun. 19, 2011, 9 pages.
Manning, "Deep Learning of Hierarchical Structure", In Proceedings of Learning Workshop, Apr. 13, 2011,1 page.
Mao et al., "Deep Captioning with Multimodal Recurrent Neural Networks (m-RNN)," In Proceedings of 3rd International Conference on Learning Representations, May 7, 2015, 15 pages.
Mao et al., "Explain Images with Multimodal Recurrent Neural Networks," In Proceedings of Computing Repository Research, Oct. 2014, 9 pages.
Maron et al., "A Framework for Multiple-Instance Learning," In Proceedings of Advances in Neural Information Processing Systems, Nov. 30, 1998, 7 pages.
Mesnil et al., "Investigation of Recurrent-Neural-Network Architectures and Learning Methods for Spoken Language Understanding," published Aug. 25, 2013, In Proceedings of 14th Annual Conference of the International Speech Communication Association, 5 pages.
Mikolov et al., "Distributed Representations of Words and Phrases and their Compositionality," published Dec. 5, 2013, In Proceedings of Advances in Neural Information Processing Systems 26, 9 pages.
Mikolov et al., "Efficient Estimation of Word Representations in Vector Space," published Jan. 2012, In Proceedings of the Computing Research Repository, 12 pages.
Mikolov et al., "Recurrent Neural Network Based Language Model," published Sep. 26, 2010, In Proceedings of 11th Annual Conference of the International Speech Communication Association, 4 pages.
Mikolov et al., "Strategies for Training Large Scale Neural Network Language Models," In Proceedings of Automatic Speech Recognition and Understanding Workshop, Dec. 2011, pp. 196-201, 6 pages.
Mitchell et al., "Midge: Generating Image Descriptions from Computer Vision Detections," In Proceedings of the 13th Conference of the European Chapter of the Association for Computational Linguistics, Apr. 23, 2012, pp. 747-756, 10 pages.
"MLlib—Feature Extraction and Transformation", Published on: Oct. 16, 2014, Available at: https://spark.apache.org/docs/1.1.0/mllib-feature-extraction.html, 6 pages.

(56) References Cited

OTHER PUBLICATIONS

Mnih et al., "A Fast and Simple Algorithm for Training Neural Probabilistic Language Models," In Proceedings of the 29th International Conference on Machine Learning, Jun. 26, 2012, 8 pages.
Mnih, et al., "Three New Graphical Models for Statistical Language Modelling," In Proceedings of the 24th International Conference on Machine Learning, Jun. 20, 2007, pp. 641-648, 8 pages.
Modaghegh et al., "Learning of Relevance Feedback Using a Novel Kernel Based Neural Network," In Australian Journal of Basic and Applied Sciences, vol. 4, Issue 2, Feb. 2010, 16 pages.
Nesterov, "A Method of Solving a Convex Programming Problem with Convergence Rate O (1/k2)," published Feb. 1983, In Journal of Soviet Mathematics Doklady.
Norman, "Google Develops A Neural Image Caption Generator to Translate Images into Words," Published on: Nov. 17, 2014, Available at: http://historyofinformation.com/expanded.php?id=4768, 2 pages.
Och, "Minimum Error Rate Training in Statistical Machine Translation," In Proceedings of the 41st Annual Meeting on Association for Computational Linguistics—vol. 1, Jul. 7, 2003, pp. 160-167, 8 pages.
Ordonez et al., "Im2Text: Describing Images Using 1 Million Captioned Photographs," In Proceedings of Advances in Neural Information Processing Systems 24, Dec. 12, 2011, 9 pages.
Palangi et al., "Semantic Modelling With Long-Short-Term Memory for Information Retrieval," published Dec. 2014, In Proceedings of the Computing Research Repository, 5 pages.
Papineni et al., "BLEU: a Method for Automatic Evaluation of Machine Translation," In Proceedings of the 40th Annual Meeting of the Association for Computational Linguistics, Jul. 2002, pp. 311-318, 8 pages.
Pascanu et al., "On the Difficulty of Training Recurrent Neural Networks," published Jun. 16, 2013, In Proceedings of the 30th International Conference on Machine Learning, 12 pages.
Ramnath et al., "AutoCaption: Automatic Caption Generation for Personal Photos," In Proceedings of IEEE Winter Conference on Applications of Computer Vision, Mar. 24, 2014, 8 pages.
"Rapid Progress in Automatic Image Captioning", Published on: Nov. 18, 2014, Available at: http://blogs.technet.com/b/machinelearning/archive/2014/11/18/rapid-progress-in-automatic-image-captioning.aspx, 5 pages.
Rashtchian et al., "Collecting Image Annoations Using Amazon's Mechanical Turk," In Proceedings of the NAAC HLT Workshop on Creating Speach and Language Data with Amazon's Mechanical Turk. Jun. 6, 2010, pp. 139-147, 9 pages.
Ratnaparkhi, "Trainable Approaches to Surface Natural Language Generation and their Application to Conversational Dialog Systems," In Proceedings of Computer Speech & Language, vol. 16, Issues 3-4, Jul. 2002, Abstract only, 2 pages.
Ratnaparkhi, "Trainable Methods for Surface Natural Language Generation", In Proceedings of the 1st North American chapter of the Association for Computational Linguistics conference, Apr. 29, 2000, pp. 194-201, 8 pages.
Robinson, "An Application of Recurrent Nets to Phone Probability Estimation," In Proceedings of IEEE Transactions on Neural Networks, vol. 5, Issue 2, 16 pages.
Sak et al., "Long Short-Term Memory Based Recurrent Neural Network Architectures for Large Vocabulary Speech Recognition," published Feb. 2014, In Proceedings of the Computing Research Repository, 5 pages.
Sak et al., "Long Short-Term Memory Recurrent Neural Network Architectures for Large Scale Acoustic Modeling," published Sep. 14, 2014, In Proceedings of 15th Annual Conference of the International speech Communication Association, 5 pages.
Shen et al., "A Latent Semantic Model with Convolutional-Pooling Structure for Information Retrieval," published Nov. 3, 2014, In Proceedings of the 23rd ACM International Conference on Conference on Information and Knowledge Management, 10 pages.
Simonyan et al., "Very deep Convolutional Networks for Large-scale Image Recognition," In Proceedings of the Computing Research Repository, Sep. 2014, 14 pages.
Socher et al., "Grounded compositional semantics for finding and describing images with sentences," In Proceedings of NIPS Deep Learning Workshop, Dec. 9, 2013, 12 pages.
Staudemeyer et al., "Evaluating performance of long short-term memory recurrent neural networks on intrusion detection data," published Oct. 7, 2013, In Proceedings of the South African Institute for Computer Scientists and Information Technologists Conference, 7 pages.
Sutskever et al., "Generating Text with Recurrent Neural Networks," published Jun. 28, 2011, In Proceedings of the 28th International Conference on Machine Learning, 8 pages.
Sutskever et al., "On the Importance of Initialization and Momentum in Deep Learning," published Jun. 16, 2013, In Proceedings of the 30th International Conference on Machine Learning, 9 pages.
Sutskever et al., "Sequence to Sequence Learning with Neural Networks," published Dec. 8, 2014, In Proceedings of Twenty-eighth Annual Conference on Neural Information Processing Systems, 9 pages.
Vedantam et al., "CIDEr: Consensus-Based Image Description Evaluation," In Journal of Computing Research Repository, Nov. 2014, 10 pages.
Vinyals et al., "A Picture is Worth a Thousand (coherent) Words: Building a Natural Description of Images," Published on: Nov. 17, 2014, Available at: http://googleresearch.blogspot.in/2014/11/a-picture-is-worth-thousand-coherent.html, 9 pages.
Vinyals et al., "Show and Tell: A Neural Image Caption Generator," In Journal of Computing Research Repository, Nov. 2014, 9 pages.
Viola et al., "Multiple Instance Boosting for Object Detection," In Proceedings Advances in Neural Information Processing Systems, Jan. 2007, 8 pages.
Xu et al., "Show, Attend and Tell: Neural Image Caption Generation with Visual Attention," In Journal of Computing Research Repository, Feb. 2015, 22
Yang et al., "Corpus-Guided Sentence Generation of Natural Images," In Proceedings of the Conference on Empirical Methods in Natural Language Processing, Jul. 27, 2011, 11 pages.
Yao et al., "I2T: Image Parsing to Text Description," In Proceedings of the IEEE, vol. 98, Issue 8, Jun. 17, 2010, 24 pages.
Yih et al., "Semantic Parsing for Single-Relation Question Answering," In Proceedings of the 52nd Annual Meeting of the Association for Computational Linguistics, Jun. 22, 2014, 6 pages.
Yu et al., "Deep Learning and and its Applications to Signal and Information Processing [Exploratory DSP]," published Jan. 2011, In Proceedings of IEEE Signal Processing Magazine, vol. 28, Issue 1, 6 pages.
Zitnick et al., "Bringing Semantics into Focus using Visual Abstraction," In Proceedings of the IEEE Conference on Computer Vision and Pattern Recognition, Jun. 23, 2013, 8 pages.
Zitnick et al., "Edge Boxes: Locating Object Proposals from Edges," In Proceedings of 13th European Conference on Computer Vision, Sep. 2014, 15 pages.
Office Action for U.S. Appl. No. 14/839,430, dated Feb. 16, 2017.
Gao et al., "Discovery of Semantic Similarities Between Images and Text", 11 pages.

* cited by examiner

SEMANTICALLY-RELEVANT DISCOVERY OF SOLUTIONS

BACKGROUND

A vast amount of data is stored in various forms of data stores. Typically, to access the data, a user submits a request for information, such as via a web browser. A server receives the request, and based on the context of the request, finds one or more responses. To determine the context, the server traditionally recognizes a category of the request, and combines the category with the contents of the request. The server then matches the context of the request to the context of one or more responses, and returns the one or more responses to the user. However, because it is difficult to determine the context of the request, the server often returns irrelevant responses.

SUMMARY

This disclosure describes systems, methods, and computer-readable media for providing semantically-relevant discovery of solutions. In some configurations, a computing device can receive an input, such as a query. The computing device can process each word of the input, and determine a semantic representation of the input. Techniques and technologies described herein determine a response (e.g., a document, solution, answer, etc.) to the input, such as an answer to a query, based on the semantic representation of the input matching (e.g., being substantially similar to) a semantic representation of the response. An output including one or more relevant responses to the input can then be provided to the requestor.

Example techniques described herein can apply machine learning to train a model with click-through data to provide semantically-relevant discovery of solutions. Example techniques described herein can apply recurrent neural networks (RNN) and/or long short term memory (LSTM) cells in the machine learning model.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to systems, methods, computer-readable instructions, modules, algorithms, hardware logic and/or operations as permitted by the context described above and throughout the document. Furthermore, the claimed subject matter is not limited to implementations that solve any or all disadvantages noted in any part of this disclosure. Additionally, the terms "input," "request," "query," "question," and the like, are intended to describe user-submitted requests for information; the terms "solution," "answer," "response," "documents," and the like, are intended to describe responses to the input.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
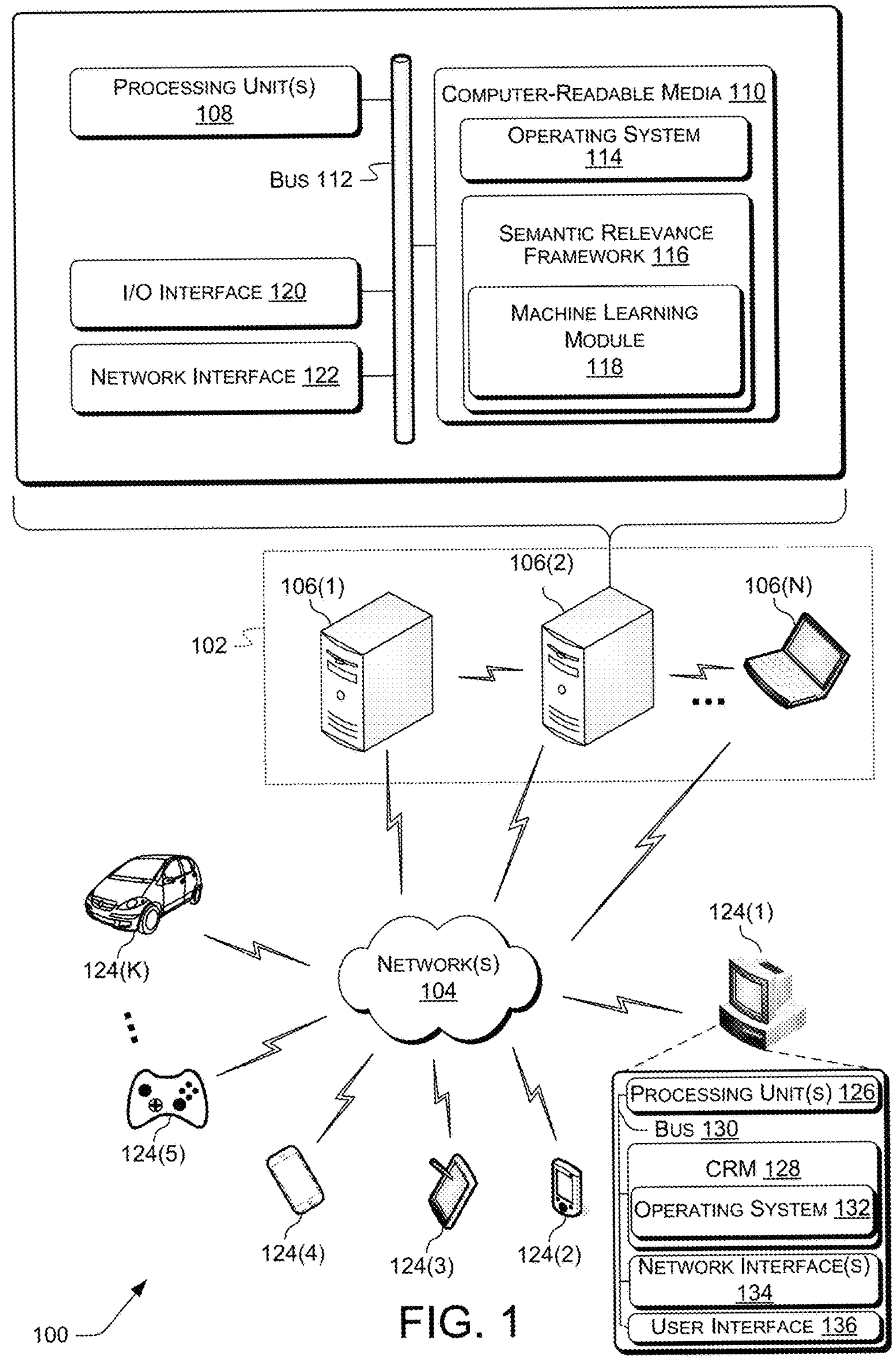
FIG. 1 is a block diagram depicting an example environment in which examples of solution discovery by semantic relevance optimization can operate.

The technologies described herein provide techniques and constructs to improve the relevance of responses to inputs (e.g., query, question, request for information, etc.), such as providing a relevant response to a search query, by optimizing the semantic similarity between the input and the response. In some examples, a computing system can receive an input for information comprising one or more words (e.g., a bag of words, sentence, etc.). The computing system can sequentially process each word in the input, and, using a neural network, map the words one-by-one into in a hidden semantic space, replete with historical information. After each word is mapped, the computing system can determine a semantic representation for the input based on the value and dimensionality of the resulting natural embedding vector.

In various examples, the computing system can search for one or more responses (e.g., documents, solutions, answers, etc.) that are substantially similar to (e.g., match) the semantic representation of the input, and present the one or more responses. For instance, the computing system can receive a question, determine the semantic representation of the question, and respond with a semantically-relevant answer to the question based on matching semantic representations.

In some examples, the computing system can analyze the inputs and responses independent of the language of either the input or the response. For instance, an input may be submitted in Chinese and mapped to a hidden vector with a semantic representation that matches the semantic representation of a response in English. Thus, the computing system may determine a semantically relevant solution to a request absent a lexicon gap.

Additionally, the computing system can apply machine learning to train a model with click-through data to provide semantically-relevant discovery of solutions. The computing system may receive data regarding a particular input, as well as relevant and irrelevant documents responsive to the input. For example, the computing system can recognize relevant documents as those with a high click rate in response to a request, whereas irrelevant documents may have a low click rate.

In various examples, the computing system can map the similarity between the input and the response. The computing system can then apply a training algorithm to maximize the similarity between the input and a relevant response, and/or minimize the similarity between the input and an irrelevant response. In some examples, the training can comprise defining one or more parameters associated with the system.

In various examples, the computing system may apply a long short term memory (LSTM) cell to the training model. In such examples, the computing system may train the LSTM input, output and forget gates to selectively remember and/or forget certain words. For example, salient words may be processed in a way such that they influence the semantic representation of the input. For another example, unimportant words may be processed in a way such that they do not influence the semantic representation of the input.

Illustrative Environment

The environment described below constitutes but one example and is not intended to limit the claims to any one particular operating environment. Other environments can be used without departing from the spirit and scope of the claimed subject matter.

FIG. 1 shows an example environment 100 in which solution discovery by semantic relevance optimization can be implemented. In some examples, the various devices and/or components of environment 100 include distributed computing resources 102 that can communicate with one another and with external devices via one or more networks 104.

For example, network(s) 104 can include public networks such as the Internet, private networks such as an institutional and/or personal intranet, or some combination of private and public networks. Network(s) 104 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 104 can utilize communications protocols, including packet-based and/or datagram-based protocols such as internet protocol (IP), transmission control protocol (TCP), user datagram protocol (UDP), or other types of protocols. Moreover, network(s) 104 can also include a number of devices that facilitate network communications and/or form a hardware basis for the networks, such as switches, routers, gateways, access points, firewalls, base stations, repeaters, backbone devices, and the like.

In some examples, network(s) 104 can further include devices that enable connection to a wireless network, such as a wireless access point (WAP). Example embodiments support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various examples, distributed computing resources 102 include devices 106(1)-106(N). Embodiments support scenarios where device(s) 106 can include one or more computing devices that operate in a cluster or other grouped configuration to share resources, balance load, increase performance, provide fail-over support or redundancy, or for other purposes. Device(s) 106 can belong to a variety of categories or classes of devices such as traditional server-type devices, desktop computer-type devices, mobile devices, special purpose-type devices, embedded-type devices, and/or wearable-type devices. Thus, although illustrated as desktop and laptop computers, device(s) 106 can include a diverse variety of device types and are not limited to a particular type of device. Device(s) 106 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

Device(s) 106 can include any type of computing device having one or more processing unit(s) 108 operably connected to computer-readable media (CRM) 110 such as via a bus 112, which in some instances can include one or more of a system bus, a data bus, an address bus, a PCI bus, a Mini-PCI bus, and any variety of local, peripheral, and/or independent buses.

CRM described herein, e.g., CRM 110, include computer storage media and/or communication media. Computer storage media includes tangible storage units such as volatile memory, nonvolatile memory, and/or other persistent and/or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, and/or storage media that can be used to store and maintain information for access by a computing device 106 or consumer computing device 124.

In contrast to computer storage media, communication media can embody computer-readable instructions, data structures, program modules, or other data in a modulated data signal, such as a carrier wave, or other transmission mechanism. As defined herein, computer storage media does not include communication media.

Executable instructions stored on CRM 110 can include, for example, an operating system 114, a semantic relevance framework 116, a machine learning module 118, and other modules, programs, or applications that are loadable and executable by processing units(s) 108. Additionally or alternatively, the functionally described herein can be performed, at least in part, by one or more hardware logic components such as accelerators. For example, and without limitation, illustrative types of hardware logic components that can be used include Field-Programmable Gate Arrays (FPGAs), Application-specific Integrated Circuits (ASICs), Application-Specific Standard Products (ASSPs), System-on-a-Chip systems (SOCs), Complex Programmable Logic Devices (CPLDs), etc. For example, an accelerator can represent a hybrid device, such as one from XILINX or ALTERA that includes a CPU course embedded in an FPGA fabric.

Device 106 can also include one or more input/output (I/O) interfaces 120 to allow device 100 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). For simplicity, other components are omitted from the illustrated device 106.

Device 106 can also include one or more network interfaces 122 to enable communications between computing device 106 and other networked devices such as consumer computing device(s) 124 through which a consumer can submit an input (e.g., a query, question, request for information, etc.). Such network interface(s) 122 can include one or more network interface controllers (NICs) or other types of transceiver devices to send and receive communications over a network.

Other devices involved in solution discovery by semantic relevance optimization, can include consumer computing devices 124(1)-124(N). Consumer computing device(s) 124 can belong to a variety of categories or classes of devices such as traditional consumer-type devices, desktop computer-type devices, mobile devices, special purpose-type devices, embedded-type devices, and/or wearable-type devices. Thus, although illustrated as mobile computing devices, which can have less computing resources than device(s) 106, consumer computing device(s) 124 can include a diverse variety of device types and are not limited to any particular type of device. Consumer computing device(s) 124 can include, but are not limited to, server computers or blade servers such as Web servers, map/reduce servers or other computation engines, or network-attached-storage units (e.g., 124(1)), laptop computers, thin clients, terminals, or other mobile computers, personal data assistants (PDAs), wearable computers such as smart watches or biometric or medical sensors, implanted computing devices such as biometric or medical sensors, computer navigation consumer computing devices, satellite-based navigation system devices including global positioning system (GPS) devices and other satellite-based navigation system devices (e.g., 124(2), represented graphically as a PDA), tablet computers or tablet hybrid computers (e.g., 124(3)), smartphones, mobile phones, mobile phone-tablet hybrid devices, or other telecommunication devices (e.g., 124(4)), portable or console-based gaming devices or other entertainment devices such as network-enabled televisions, set-top boxes, media players, cameras, or personal video recorders (PVRs) (e.g., 124(5), represented graphically as a gamepad), automotive computers such as vehicle control systems, vehicle security systems, or electronic keys for vehicles (e.g., 124(K), represented graphically as an automobile), desktop computers (e.g., 124(1)), or integrated components for inclusion in computing devices, appliances, or other computing devices configured to participate in or carry out solution discovery by semantic representation optimization as described herein.

Consumer computing device(s) 124 can represent any type of computing device having one or more processing unit(s) 126 operably connected to computer-readable media (CRM) 128 such as via a bus 130, which in some instances can include one or more of a system bus, a data bus, an address bus, a PCI bus, a Mini-PCI bus, and any variety of local, peripheral, and/or independent buses.

Executable instructions stored on CRM 128 can include an operating system 132 and other modules, programs, or applications that are loadable and executable by processing units(s) 126. Additionally or alternatively, the functionally described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from XILINX or ALTERA that includes a CPU course embedded in an FPGA fabric.

Consumer computing device 124 can also include one or more I/O interfaces including one or more network interfaces 134 and user interfaces 136 to enable communications between consumer computing device 124 and other networked devices such as other consumer computing device(s) 124 or devices 106 over network(s) 104. Such network interface(s) 134 can include one or more network interface controllers (NICs) or other types of transceiver devices to send and receive communications over a network.

Consumer computing device 124 can also include a user interface 136 to enable the device 124 to receive user input and a response to the input. Examples support the user interface 136 receiving input from the user, such as, for example, a query. Additionally or alternatively, the user interface 136 can provide a display of the semantic representation of the input, one or more solutions provided in response to the input, and/or the semantic similarity between input and the one or more solutions.

Figure 2:
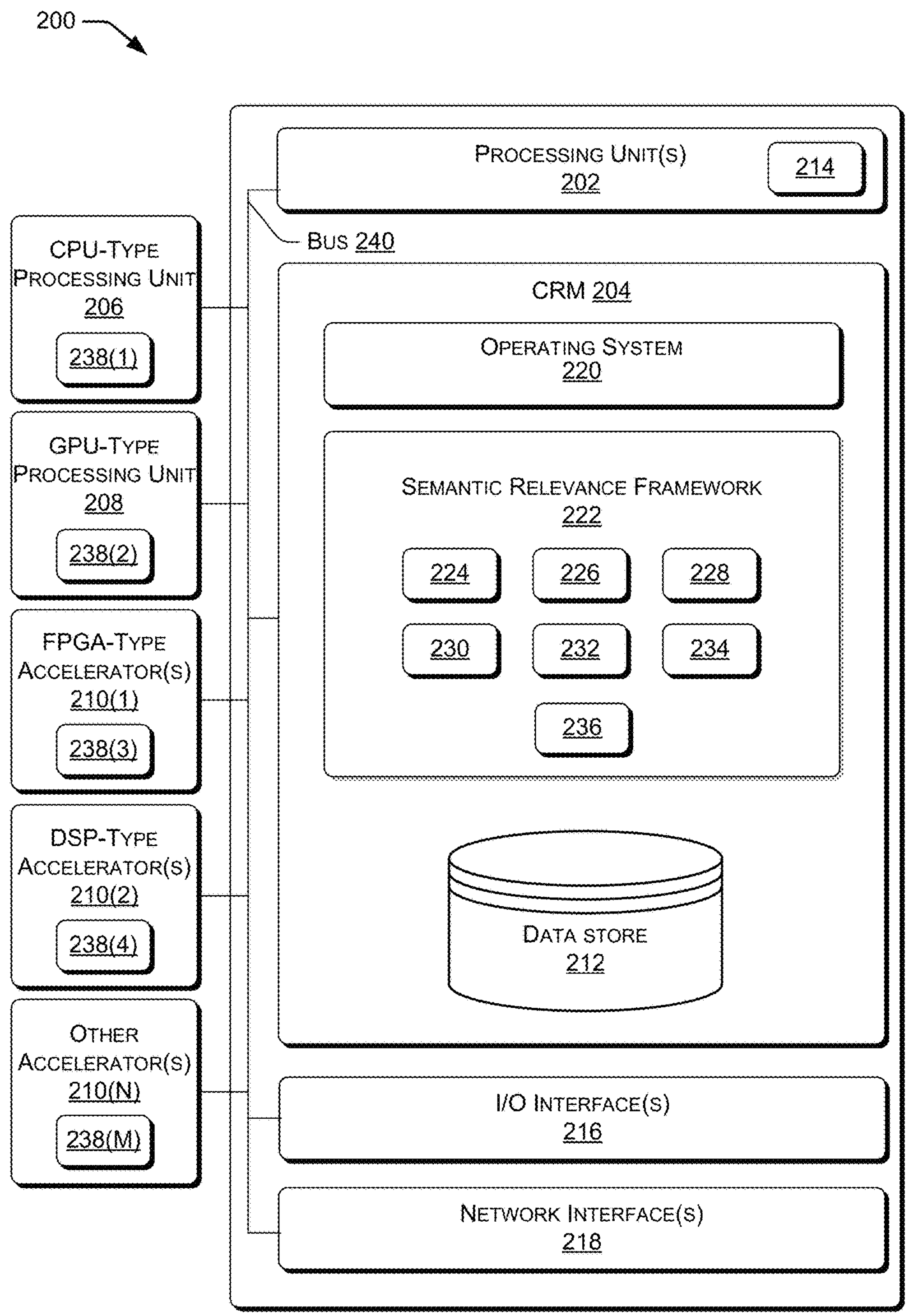
FIG. 2 is a block diagram depicting an example computing device configured to participate in a solution discovery by semantic relevance optimization system.

FIG. 2 is a block diagram depicting an example computing device 200 configured to participate in a solution discovery by semantic relevance optimization system. In some examples, computing device 200 may be one computing device of a distributed computing resource, such as a device 106 from FIG. 1. In device(s) 200, processing unit(s) 202, can include processing unit(s) 108 and can represent, for example, a CPU-type processing unit, a GPU-type processing unit, a field-programmable gate array (FPGA), another class of digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

In some examples, CRM 204 can represent CRM 110 and can store instructions executable by the processing unit(s) 202, which as discussed above, can represent a processing unit incorporated in device 200. CRM 204 can also store instructions executable by external processing units such as by an external CPU-type processing unit 206, an external GPU-type processing unit 208, and/or executable by an external accelerator 210, such as an FPGA-type accelerator 210(1), a DSP-type accelerator 210(2), or any other accelerator 210(N). In various examples at least one CPU-type processing unit, GPU-type processing unit, and/or accelerator is incorporated in device 200, while in some examples one or more of a CPU-type processing unit, GPU-type processing unit, and/or accelerator is external to device 200.

In the illustrated example, CRM 204 also includes a data store 212. In some examples, data store 212 includes data storage such as a database, data warehouse, or other type of structured or unstructured data storage. In some examples, data store 212 includes a corpus and/or a relational database with one or more tables, indices, stored procedures, and so forth to enable data access such as web tables including one or more of hypertext markup language (HTML) tables, resource description framework (RDF) tables, web ontology language (OWL) tables, and/or extensible markup language (XML) tables, for example. Data store 212 can store data and/or instructions for the operations of processes, applications, components, and/or modules stored in CRM 204 and/or executed by processing unit(s) 202. Alternately, some or all of the above-referenced data and/or instructions can be stored on separate memories 214 on board one or more processing unit(s) 202 such as a memory on board a CPU-type processor, a GPU-type processor, an FPGA-type accelerator, a DSP-type accelerator, and/or another accelerator.

Device(s) 200 can further include one or more input/output (I/O) interfaces 216, which can be I/O interface 120 to allow device 200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). In addition, in device(s) 200, network interface(s) 218, which can be network interface(s) 122, can represent, for example, network interface controllers (NICs) or other types of transceiver devices to send and receive communications over a network.

In the illustrated example, CRM 204 also includes an operating system 220, which can be operating system 114. CRM 204 also includes a semantic relevance framework 222, which can be semantic relevance framework 116. Semantic relevance framework 222 can include one or more modules and/or APIs, which are illustrated as blocks 224, 226, 228 230, 232, 234, and 236 although this is just an example, and the number can vary higher or lower.

Functionality described associated with blocks 224, 226, 228 230, 232, 234, and 236 can be combined to be performed by a fewer number of modules and/or APIs or it can be split and performed by a larger number of modules and/or APIs. For example, block 224 can represent an input module with logic to program processing unit 202 of device 200 to deliver one or more inputs (e.g., queries, questions, requests for information, etc.) to the semantic relevance framework 222 for processing.

Block 226 can represent an initial mapping module with logic to program processing unit 202 to calculate a vector for each word of the one or more inputs. In various examples, the vector can be a one-hot vector. In such examples, the word can be assigned an index including a number based on the total number of words in a vocabulary. For example, with a vocabulary of 1,000,000 words, the index may be any number from 0 to 999,999. The resulting one-hot vector for the i-th word of the one or more inputs can be a 1-million dimensional vector, in which only the i-th position value is "1" and the remaining positions have a value of "0."

In some examples, the vector can be a letter n-gram vector. In at least one example, the vector can be a letter trigram vector. For example, for a word "cat," can be calculated into a letter trigram including "#ca," "cat," and "#cat." Each letter trigram in a letter trigram vocabulary can be assigned an index. For example, with a vocabulary of 50,000 letter trigrams, the index may be any number from 0 to 49,999. The resulting letter trigram vector for a word can be a 50,000 dimensional vector with three positions having a value of "1" and 49,997 positions having a value of "0."

In various examples, the initial mapping module can calculate the vector by using a fixed hashing operator. In other examples, the vector calculation may be performed by applying a dynamic hashing operator. Additionally, the initial mapping module can include logic to program the processing unit 202 to calculate an initial hidden vector of a query.

Block 228 can represent a mapping module with logic to program processing unit 202 to apply a first parameter to the vector and a second parameter to the hidden vector associated with each word of the input. In various examples, the mapping module can sequentially process each word of the input, from left to right. In some examples, the mapping module can sequentially process each word of the input from right to left. In response to the processing, the mapping module may calculate a hidden vector representative of at least the semantic value of the processed words. In various examples, the output of the mapping module may comprise a semantic representation of the input as a whole. In some examples, the output semantic representation may be determined by the hidden vector calculated after processing the last word of the input. In other examples, the output semantic representation may be determined by the hidden vector with the highest value.

For example, with an input of two words, the mapping module can apply a first parameter to the vector associated with the first word of an input, and a second parameter to the initial hidden vector of the input, the initial hidden vector being associated with the first word of the input. In response to the application of the first parameter to the vector and the second parameter to the initial hidden vector, the mapping module can calculate a first hidden vector. The mapping module can then apply the first parameter to the second word of the input and the second parameter to the first hidden vector to calculate a second hidden vector. Because the query string is two words, the resulting second hidden vector represents the semantic representation (e.g., semantic value) of the input.

In various examples, the mapping module can comprise a neural network to map the one or more words of the one or more inputs into a hidden vector. In at least one example, the mapping module can comprise a recurring neural network (RNN model). In some examples, the mapping module can comprise a long short term memory (LSTM) cell (RNN-LSTM model).

Block 230 can represent a matching module with logic to program processing unit 202 to discover one or more responses (e.g., documents, solutions, answers, etc.) to the input. In various examples, the matching module can input the semantic representation of the input from the mapping module, and search data storage (e.g., data table, database, etc.) containing a plurality of responses, for one or more responses with substantially similar semantic representations.

In some examples, the matching module may search a database of responses stored on the computing device 200, such as, for example, in data store 206. In some examples, the database of responses can be extracted or received from a consumer computing device 124, such as via the network interface 218, and stored in data store 212.

Block 232 can represent a ranking module with logic to program processing unit 202 of device 200 for ranking the one or more responses discovered by the matching module. In various examples, the ranking module can rank the one or more responses based how close the semantic representation of the input matches a semantic representation of each of the one or more responses. In some examples, the ranking module can generate a list of solutions based on the ranking In some examples, the list of responses can include a pre-determined number of responses that are deemed to be substantially semantically similar. In some examples, the list of responses can include a list of responses with semantic representations that are within a pre-determined value difference from the value of the semantic representation of the input.

Block 234 can represent an output module with logic to program processing unit 202 for sending the ranked list of responses for presentation, such as, for example, via I/O interface 210 and/or network interface 212.

Block 236 can represent a machine learning module with logic to program processing unit 202 of device 200 for extraction of a plurality of inputs and corresponding click-through data (e.g., relevant documents, irrelevant documents, mapping parameters, and any other statistics relevant to the solution discovery operation). In some examples, the click-through data may be stored on computing device 200, such as, for example, in data store 212. In some examples, the click-through data can be extracted or received from a remote computing device, such as via the network interface 218, and stored in data store 212.

In various examples, the machine learning module can train the system periodically, such as, for example, at a specified time each day. In some examples, the periodic interval can be determined by a program manager (e.g., monthly, weekly, daily). In some examples, the machine learning module can obtain or access data when manually directed by the program manager.

In some examples, the machine learning module can train the system continuously, such as, for example, in an online mode. In such an example, the machine learning module can train the semantic relevance model continuously with a substantially continuous collection of samples.

Alternatively, some or all of the above-referenced data can be stored on separate memories 238, such as memory 238(1) on board a CPU-type processing unit 206, memory 238(2) on board a GPU-type processing unit 208, memory 238(3) on board an FPGA-type accelerator 210(1), memory 238(4) on board a DSP-type accelerator 210(2), and/or memory 238(M) on board another accelerator 210(N).

Bus 240, which can be bus 112, and which in some instances can include one or more of a system bus, a data bus, an address bus, a PCI bus, a Mini-PCI bus, and any variety of local, peripheral, and/or independent buses, can operably connect CRM 204 to processing unit(s) 202.

Figure 3:
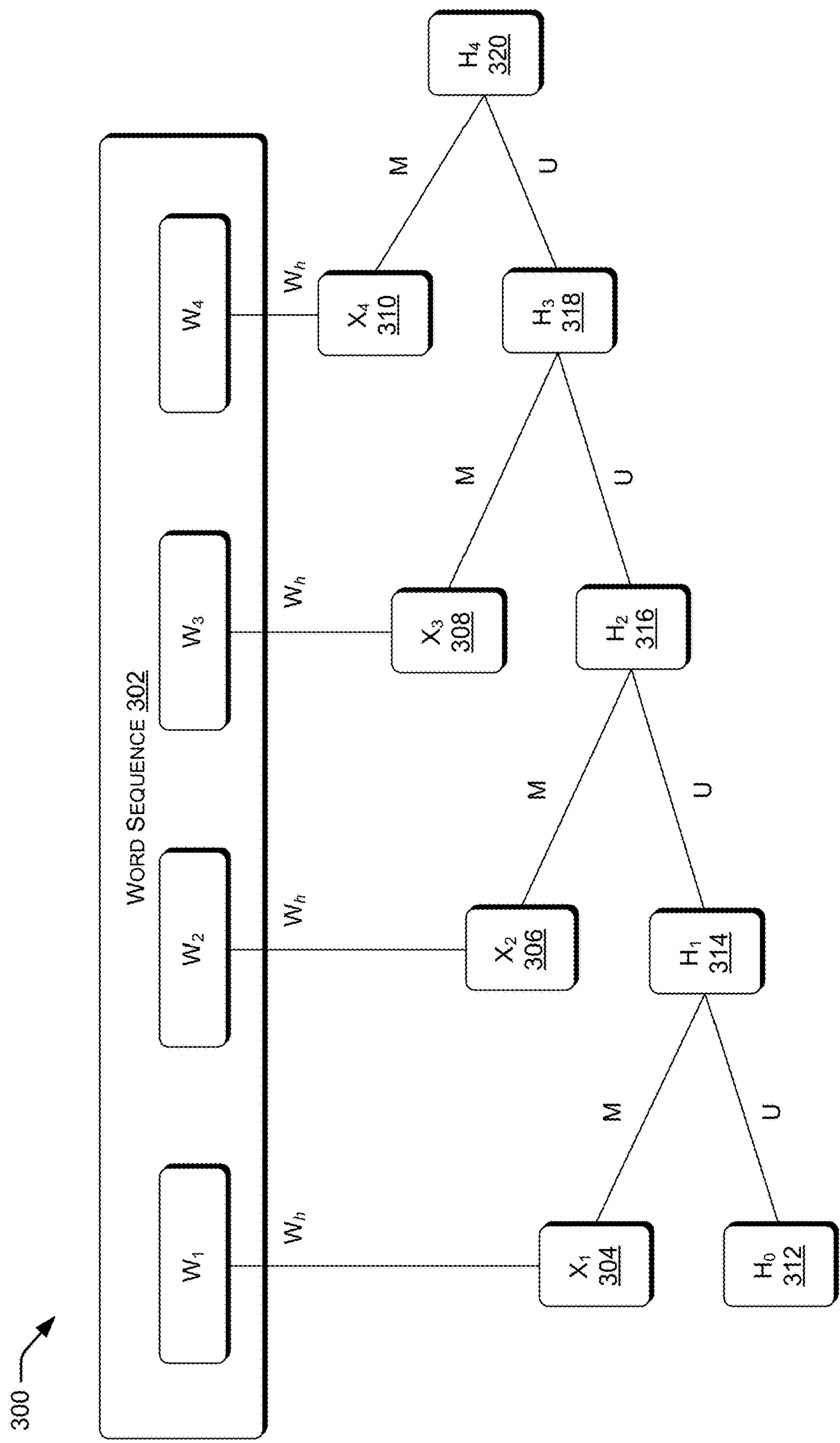
FIG. 3 is a dataflow diagram depicting an example architecture of a processes that a semantic relevance framework can perform to determine a semantic representation of a query in the operation of solution discovery by semantic relevance optimization.

FIG. 3 is a dataflow diagram depicting example architecture 300 of processes that semantic relevance framework 116/216 can perform to determine the semantic relevance of an input (e.g., a query, question, request for information, etc.). The input can be entered in a myriad of forms, such as, for example, a phrase, a sentence, a bag of words, a series of characters, and a series of symbols, to name a few. Semantic relevance framework 116/216 can process the input illustrated as a word sequence 302, and output a hidden vector $H_4$ representative of a semantic representation of the word sequence 302.

In the illustrative example, the word sequence 302 comprises four words, $W_1$-$W_4$. In other examples, the word sequence 302 may comprise a greater or lesser number of words. The word sequence 302 can represent an input to a web search engine, such as, for example, a query, a question, an inquiry, or a request for information.

In various examples, an initial mapping module, such as initial mapping module depicted in block 220, can calculate a vector X for each word of the word sequence 302 using a fixed hashing operator $W_h$. The vector X(t) for the t-th word, W(t), can be represented as follows:

$$X(t)=W_h W(t) \tag{1}$$

In various examples, the resulting vector X can comprise a relatively low dimensional letter tri-gram representation. Thus, the initial mapping module can convert a high dimensional input into a relatively lower dimensional output. As illustrated, the initial mapping module can calculate $X_1$ 304 corresponding to $W_1$, $X_2$ 306 corresponding to $W_2$, 308 corresponding to $W_3$ and $X_4$ 310 corresponding to $W_4$.

Additionally, the initial mapping module can determine an initial hidden vector, $H_0$ 312, for the word sequence 302. In some examples, the initial mapping module can calculate a value and dimension for $H_0$ 312. In some examples, the initial mapping module may access the value and dimension for $H_0$ 312 from a data store, such as data store 206.

In various examples, the mapping module, such as mapping module depicted in block 222, can map each word of the word sequence 302 sequentially from $W_1$ to $W_4$ (e.g., from left to right) to determine a value of the resulting hidden vector $H_t$. In other examples, the mapping module can map each word of the word sequence 302 sequentially from $W_4$ to $W_1$. In some examples, the mapping module can comprise a recurrent neural network. In some examples, the mapping model can comprise other neural networks (e.g., a feedforward neural network, a self-organizing networks, dynamic neural networks, or other types of neural networks).

The mapping module can map the words by applying parameters, such as parameters M and U. Parameter M can be an input weight matrix, and U can be a recurrent weight matrix. In at least one example, the input weight matrix can be a letter trigram. The value of each hidden vector can be represented as follows:

$$H_t=\sigma(M^T X_t+U^T H_{(t-1)}), \tag{2}$$

where $M^T$ and $U^T$ non-linearly transform a vector (e.g., $X_1$ 304) and a hidden vector (e.g., $H_0$ 312) into a new hidden vector (e.g., $H_1$ 314). For example, $$H_2=\sigma(M^T X_2+U^T H_{(1)}).$$

In various examples, the transformations $M^T$ and $U^T$ comprise non-linear transformations. The non-linear activation function σ( ) can be sigmoid, tan h, rectified, etc. In such examples, the mapping module is able to extract more abstract information from the raw data associated with each vector $X_t$. Thus, in the calculation of each hidden vector $H_0$ 312, $H_1$ 314, $H_2$ 316, $H_3$ 318 and $H_4$320, the mapping module extracts information about each word $W_1$-$W_4$ of the word sequence 302 from the respective vectors $X_1$ 304, $X_2$ 306, $X_3$ 308 and $X_4$310, and applies historical information from the previous hidden vector.

The resulting value, $$H_4=\sigma(M^TX_4+U^TH_{(3)}),$$

comprises a semantic representation of the word sequence 302.

In various examples, the matching module may search a database of responses for one or more responses (e.g., documents, solutions, answers, etc.) having substantially similar semantic representations as the word sequence 302. In some examples, the responses can include a phrase, a sentence, a word sequence, a series of characters, and a series of symbols, to name a few. In some examples, the responses can include multiple phrases, sentences, etc., separated by one or more of a period, a semi-colon and/or a colon.

In various examples, the semantically-relevant discovery of responses system may comprise a long short term memory (LSTM) cell (RNN-LSTM model). In such examples, the LSTM cell may replace the non-linear activation function σ( ) described above. In some examples, the LSTM cell can comprise an input gate, an output gate, and a forget gate. The gates of the LSTM cell can be trained to selectively choose what to remember, what to pass on, and what to forget. Additionally, the LSTM cell can be trained to attenuate unimportant words, and emphasize important words (e.g., keywords) in an input and/or a response. In such examples, the RNN-LSTM model can be trained to adjust the final hidden vector (e.g., $H_4$320) of an input, thereby increasing the accuracy of the semantic representation of the sentence.

Training Environment

In various examples, the computing system can use machine learning techniques to identify documents that are typically selected by a user in response to an input (e.g., semantically relevant documents), and documents that are not selected (e.g., irrelevant documents). The term "machine learning" may refer to one or more programs that learns from the data it receives. For example, a machine learning mechanism may build, modify or otherwise utilize a model that is created from example inputs, and the machine learning mechanism can make predictions or decisions using the model. In the current example, machine learning can be used to improve the discovery of semantically-relevant responses. The model may be trained using supervised and/or unsupervised learning. For instance, over time, as the machine learning mechanism receives more data, the input/response (e.g., query/solution) response can change based on actual click-through data associated with a plurality of users.

In various examples, the training can be updated while the computing system is in an online and/or offline mode. In some examples, the computing system may receive click-through data from a source (e.g., a commercial search engine). In some examples, the computing system may receive click-through data directly from a user device. The computing system may save the click-through data, such as, for example, in a data store. In various examples, the computing system can update the training at a periodic interval (e.g., monthly, weekly, daily). In some examples, the computing system can continually update the training, as click-through data is received. In some examples, the computing system can update the training when commanded, such as, for example, by a program manager. In such examples, the command to update the training may be via a network interface and/or an I/O interface.

Figure 4:
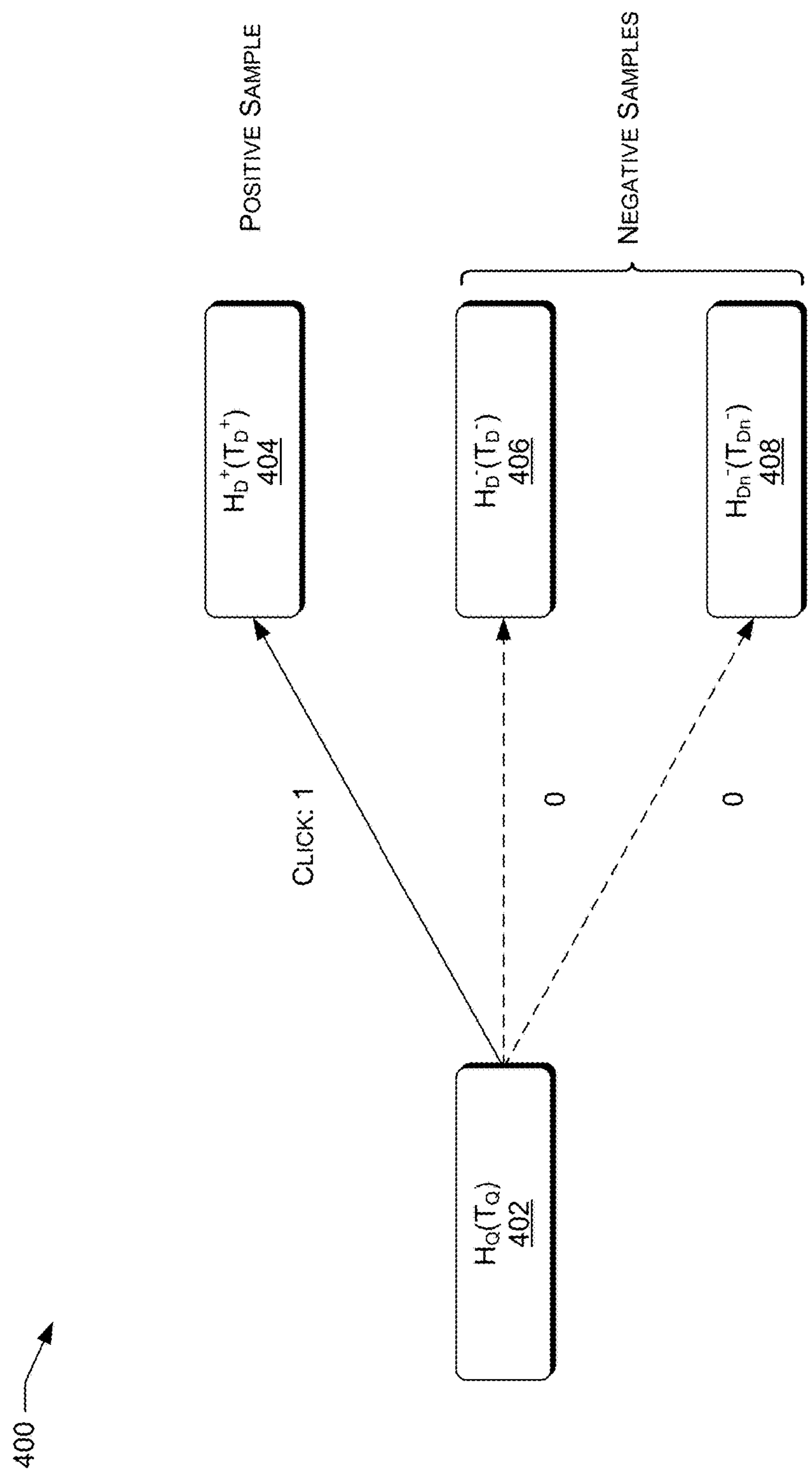
FIG. 4 is a dataflow diagram depicting an example illustration of use of a click-through signal as a binary indication of semantic similarity between an input and a responsive output.

FIG. 4 is a dataflow diagram depicting an example illustration 400 of how a click-through signal can be used as a binary indication of the semantic similarity between an input and a response. In various examples, the computing system can train the semantically-relevant discovery of responses using click-through data. For example, the computing system may receive click-through data from a commercial search engine, and may apply the click-through data to train one or more parameters.

In the illustrative example, $H_Q(T_Q)$ 402 represents a hidden vector corresponding to an input (e.g., a query, question, request for information, etc.), and {$H_D^+(T_D^+)$ 404, $H_D^-(T_D^-)$ 406 . . . [and] $H_{Dn}^-(T_{Dn}^-)$ 408} each represent hidden vectors corresponding to documents available as responses to the input. As depicted in FIG. 4, $D^+$ denotes the (clicked) positive samples among the documents, and $D^-$ denotes the (un-clicked) negative samples among the documents. For illustrative purposes, $D_j^-$ can represent the j-th (un-clicked) negative sample.

The semantic representation of an input can be determined by applying the input (e.g., word sequence of the input) to a semantic relevance framework, such as semantic relevance framework 116/216. Additionally, the semantic representation of a document can be determined by applying one or more phrases, sentences, bags of words, series of characters, series of symbols, etc., representing each document into a semantic relevance framework. In some examples, the semantic representation of the document can be determined by processing multiple phrases, sentences, bags of words, series of characters, series of symbols, etc., separated by a period, semi-colon, and/or a colon.

For example, a semantic relevance framework can receive one or more phrases, sentences, bags of words, and the like, representing the response (e.g., document, solution, answer, etc.), and can sequentially and recurrently process each word of the response, and map the words to a low dimensional vector representative of the semantic representation of the response. For another example, the semantic relevance framework can receive an input (e.g., a query, question, request for information, etc.), and can sequentially and recurrently process each word of the input, and map the words of the input to a low dimensional vector representative of the semantic representation of the input.

In various examples, positive samples, such as $H_D^+(T_D^+)$ 404 can have similar semantic representations (e.g., hidden vectors) to a query, such as $H_Q(T_Q)$ 402. On the other hand, the negative samples, such as $H_D^-(T_D^-)$ 406, can have dissimilar semantic representations to the query (e.g., the negative sample documents are not semantically relevant to the query). The similarity between the hidden vector associated with the query and the hidden vector associated with one or more documents, can be calculated by using the following cosine similarity:

$$R(Q, D) = \frac{H_Q(T_Q)^T H_D(T_D)}{\|H_Q(T_Q)\| \cdot \|H_D(T_D)\|} \tag{3}$$

where $T_Q$ and $T_D$ are the lengths of the sentence Q and sentence D, respectively. For illustrative purposes, Q denotes a "query," and D denotes a "document."

In various examples, the training of the model can be optimized by maximizing the difference between ($H_Q(T_Q)$ 402, $H_D^+(T_D^-)$ 404) and ($H_Q(T_Q)$ 402, $H_D^-(T_D^-)$ 406). In other words, the model is trained such that the similarity between $H_Q(T_Q)$ 402 and $H_D^+(T_D^+)$ 404 is far greater than the similarity between $H_Q(T_Q)$ 402 and $H_D^-(T_D^-)$ 406. In some examples, the following optimization equation can be used to optimize the training:

$$L(\Lambda)=\min_\Lambda\{-\log \Pi_{r=1}^{N} P(D_r^+|Q_r)\}=\min_\Lambda \Sigma_{r=1}^{N} l_r(\Lambda) \tag{4}$$

where Λ represents a collection of model parameters. In some examples, such as described above in FIG. 3, the model parameters of the RNN may be M and U. In various examples, the semantically-relevant discovery of solutions system may additionally comprise a long short term memory (LSTM) cell. In such examples, the LSTM cell may comprise an output gate parameter, a forget gate parameter, and an input gate parameter. Additionally or alternatively, the LSTM cell may comprise peephole parameters, such as $W_{p1}$, $W_{p2}$, $W_{p3}$ depicted in FIG. 6. In various examples, the collection of model parameters Λ for the LSTM cell may also comprise biases $b_1$, $b_2$, $b_3$, and $b_4$. The LSTM parameters will be described in greater detail in the discussion of FIG. 6.

In equation (4) above, $D_r^+$ represents the clicked document given for an r-th query, and $P(D_r^+|Q_r)$ represents a probability of the clicked document given the r-th query. N represents the number of query/clicked document pairs in the corpus, and $$l_r(\Lambda) = -\log\left(\frac{e^{\gamma R(Qr,D_r^+)}}{e^{\gamma R(Qr,D_r^+)} + \sum_{i=j}^{n} e^{\gamma R\left(Qr,D_{r,j}^-\right)}}\right) = \log\left(1+\sum_{j=1}^{n} e^{-\gamma\cdot\Delta_{r,j}}\right) \tag{5}$$

where $\Delta_{r,j}=R(Q_r,D_r^+)-R(Q_r,D_{r,j}^-)$, R(•,•) was defined in equation (3) above, $D_{r,j}^-$ represents the j-th negative candidate document for r-th query and n denotes the number of negative samples used during training.

Equation (5) above represents a logistic loss over $\Delta_{r,j}$. Equation (5) upperbounds the pairwise accuracy (e.g., the 0-1 loss). Because the similarity measure is a cosine function, $\Delta_{r,j}\in[-2, 2]$. In various examples, to have a larger range for $\Delta_{r,j}$, γ can be used for scaling to assist in penalizing the prediction error more. In such examples, the value may be set empirically by experiments on a held out dataset.

In various examples, a backpropagation through time (BPTT) technique may be used to train the semantically-relevant discovery of solutions system. In such examples, the collection of parameters Λ at epoch k may be calculated as follows:

$$\Delta\Lambda_k=\Lambda_k-\Lambda_{k-1}$$

$$\Delta\Lambda_k=\mu_{k-1}\Delta\Lambda_{k-1}-\epsilon_{k-1}\Delta L(\Lambda_{k-1}+\mu_{k-1}\Delta\Lambda_{k-1}), \tag{6}$$

where ΔL(•) represents the gradient of the cost function in equation (4), ϵ represents the learning rate, and $\mu_k$ represents a momentum parameter determined based on the scheduling scheme used for training. In at least one example, $\mu_k=0.9$ in the first and last 2% of parameter updates, and $\mu_k=0.995$ for the remainder of parameter updates.

In various examples, the gradient of the cost function ΔL(Λ) is calculated as follows:

$$\Delta L(\Lambda) = -\sum_{r=1}^{N}\sum_{j=1}^{n}\sum_{\tau}^{T}\alpha_{r,j}\frac{\delta\Delta_{r,j,\tau}}{\delta\Lambda}, \tag{7}$$

where T represents the number of time steps unfolded in the network over time and $$\alpha_{r,j} = \frac{-\gamma e^{-\gamma\Delta_{r,j}}}{1+\sum_{j=1}^{n} e^{-\gamma\Delta_{r,j}}}. \tag{8}$$

In some examples, the BPTT training technique can be implemented using minibatch training combined with a large update. In other examples, the training can be implemented using an incremental training update.

In various embodiments, the training of the semantically-relevant discovery of solutions system may be facilitated by applying a stochastic gradient descent (SGD) algorithm. A summary of an example training method algorithm for an RNN-LSTM model is described in TABLE 1.

TABLE 1

Inputs: Fixed step size "ϵ," scheduling for "μ," gradient clip threshold "$th_G$," Maximum number of Epochs "nEpoch," Total number of query/clicked-document pairs "N," Total number of unclicked (negative documents for a given query "n," Maximum sequence length for truncated BPTT "T."

Outputs: Two trained models, one in query side "$\Lambda_Q$," one in document side "$\Lambda_D$."

Initialization: Set all parameters in $\Lambda_Q$ and $\Lambda_D$ to small random numbers, I = 0, k = 1.

Procedure: LSTM-RNN($\Lambda_Q\Lambda_D$)

While i ≤ nEpoch do for "first minibatch" → "last minibatch" do r ← 1 while r ≤ N do for j = 1 → n do

Compute $\alpha_{r,j} = \frac{-\gamma e^{-\gamma\Delta_{r,j}}}{1+\sum_{j=1}^{n} e^{-\gamma\Delta_{r,j}}}$ Compute $\sum_{\tau=0}^{T}\alpha_{r,j}\frac{\delta\Delta_{r,j,\tau}}{\delta\Lambda_{k,Q}}$ TABLE 1-continued

| |
|---|
| Compute $\sum_{\tau=0}^{T} \alpha_{r,j} \frac{\delta\Delta_{r,j,\tau}}{\delta\Lambda_{k,D}}$ |
| sum above terms for Q and D over j |
| end for |
| sum above terms for Q and D over r |
| r ← r + 1 |
| end while |
| Compute gradient $\Delta L(\Lambda_{k,Q})$ using $\Delta L(\Lambda) = -\sum_{r=1}^{N}\sum_{j=1}^{n}\sum_{\tau}^{T} \alpha_{r,j} \frac{\delta\Delta_{r,j,\tau}}{\delta\Lambda}$ |
| Compute gradient $\Delta L(\Lambda_{k,D}) \longleftarrow th_G \cdot \frac{\Delta L(\Lambda_{k,Q})}{\lVert\Delta L(\Lambda_{k,Q})\rVert}$ |
| using $\Delta L(\Lambda) = -\sum_{r=1}^{N}\sum_{j=1}^{n}\sum_{\tau}^{T} \alpha_{r,j} \frac{\delta\Delta_{r,j,\tau}}{\delta\Lambda}$ |
| if $\lVert\Delta L(\Lambda_{k,Q})\rVert > th_G$ then |
| $\Delta L(\Lambda_{k,Q}) \longleftarrow th_G \cdot \frac{\Delta L(\Lambda_{k,Q})}{\lVert\Delta L(\Lambda_{k,Q})\rVert}$ |
| end if |
| if $\lVert\Delta L(\Lambda_{k,D})\rVert > th_G$ then |
| $\Delta L(\Lambda_{k,D}) \longleftarrow th_G \cdot \frac{\Delta L(\Lambda_{k,D})}{\lVert\Delta L(\Lambda_{k,D})\rVert}$ |
| end if |
| Compute $\Delta\Lambda_{k,Q}$ using $\Delta\Lambda_k = \Lambda_k - \Lambda_{k-1}$; $\Delta\Lambda_k = \mu_{k-1}\Delta\Lambda_{k-1} - \epsilon_{k-1}\Delta L(\Lambda_{k-1} + \mu_{k-1}\Delta\Lambda_{k-1})$ |
| Compute $\Delta\Lambda_{k,D}$ using $\Delta\Lambda_k = \Lambda_k - \Lambda_{k-1}$; $\Delta\Lambda_k = \mu_{k-1}\Delta\Lambda_{k-1} - \epsilon_{k-1}\Delta L(\Lambda_{k-1} + \mu_{k-1}\Delta\Lambda_{k-1})$ |
| Update $\Lambda_{k,Q} \leftarrow \Delta\Lambda_{k,Q} + \Lambda_{k-1,Q}$ |
| Update $\Lambda_{k,D} \leftarrow \Delta\Lambda_{k,D} + \Lambda_{k-1,D}$ |
| k ← k + 1 |
| end for |
| i ← i + 1 |
| end while |
| end procedure |

The SGD is but one illustrative example algorithm that the machine learning module can apply to train a model for input/response semantic relevance optimization. Other examples can use a limited-memory Broyden-Fletcher-Goldfarb-Shanno (BFGS) algorithm, an orthant-wise limited-memory quasi-Newton (OWL-QN) algorithm, or any other algorithm for input/response semantic relevance optimization.

Figure 5:
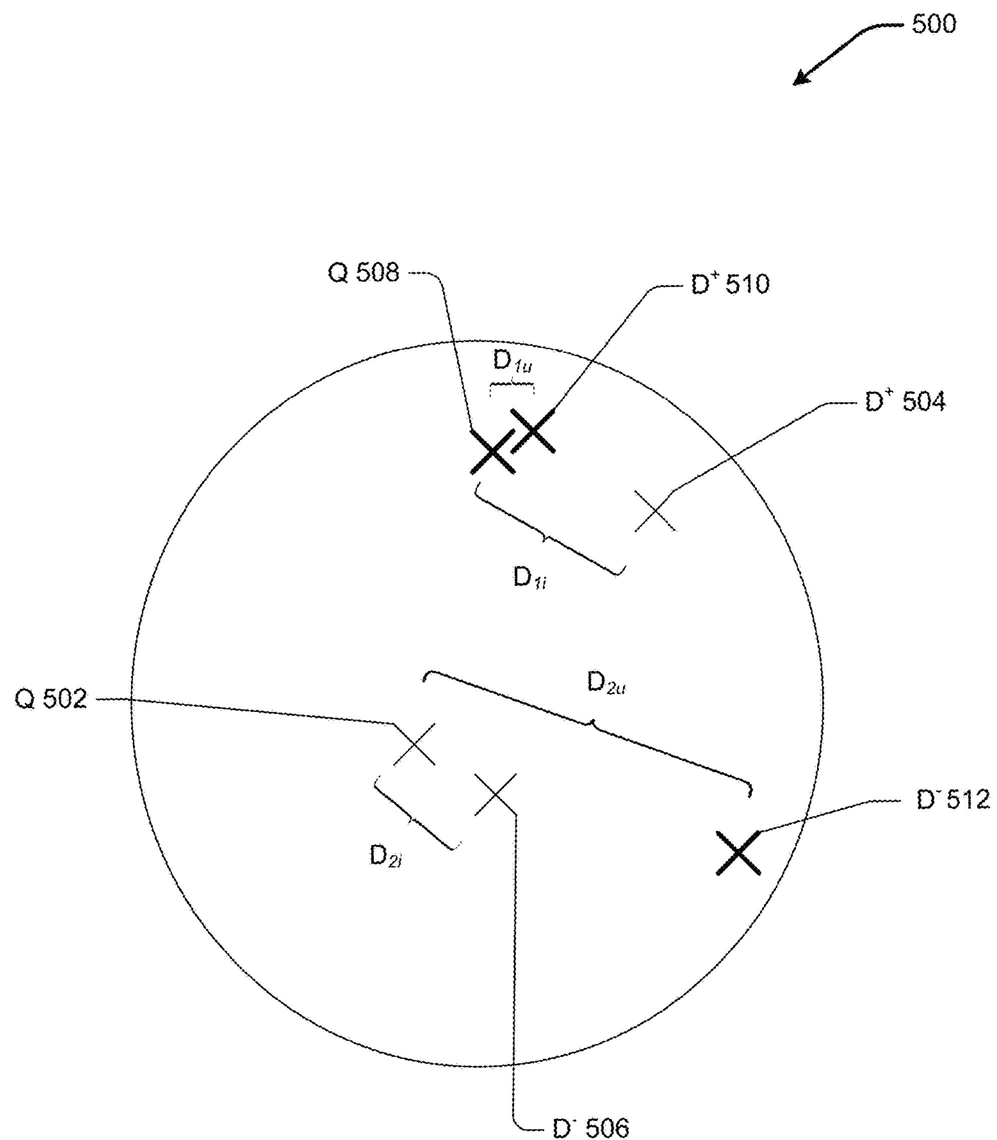
FIG. 5 is an illustrative representation of a training a system to provide semantically-relevant discovery of solutions.

FIG. 5 is an illustrative representation 500 of a result of training a system to provide semantically-relevant discovery of responses based on click-through data as described herein. Representation 500 can comprise an initial semantic representation of a query Q 502, an initial semantic representation of a relevant document $D^+$ 504, and an initial semantic representation of an irrelevant document $D^-$ 506. In other examples, a representation can comprise more than one relevant document $D^+$ and/or more than one irrelevant document $D^-$.

In various examples, a computing system may determine that the distance $D_{1i}$ between the initial semantic representation of the query Q 502 and the initial semantic representation of the relevant document $D^+$ is too large. Additionally or alternatively, the computing system may determine that the distance $D_{2i}$ between the initial semantic representation of the query Q 502 and the initial semantic representation of the irrelevant document $D^-$ is too small. In such an example, a distance D can represent an inverse relationship with the similarity between two semantic representations. For example, if a distance D between two semantic representations is large, the semantic representations are determined to be dissimilar. For another example, if a distance D between two semantic representations is small, the semantic representations are determined to be similar.

As described above, an objective of the system described herein is to provide semantically relevant documents in response to an input, such that $$\Delta=\text{sim}(Q,D^+)-\text{sim}(Q,D^-).$$

Responsive to a determination that $D_{1i}$ is too large and/or $D_{2i}$ is too small, the computing system can adjust (e.g., train) one or more parameters of the system. In various examples, the parameters can comprise an input weight matrix and a recurrent weight matrix, such as, for example, in an RNN model. Additionally or alternatively, the parameters can comprise an input gate parameter, output gate parameter, and forget gate parameter, such as, for example, in an LSTM-RNN model.

Responsive to the training of the one or more parameters, the computing system can recalculate the distances D, represented as updated distance $D_{1u}$, between the updated semantic representation of Q 508 the updated semantic representation of $D^+$ 510, and $D_{2u}$, between the updated semantic representation of Q 508 and the updated semantic representation of $D^-$ 512.

As illustrated in FIG. 5, the resulting distance $D_{1u}$, is significantly smaller, denoting a similarity between Q and the relevant document $D^+$. Additionally, the resulting distance $D_{2u}$, is significantly larger, denoting a dissimilarity between Q and the irrelevant document $D^-$.

In various examples, if distance $D_{1u}$ was not sufficiently small, and/or $D_{2u}$ was not sufficiently large, the computing system can adjust the one or more parameters iteratively until a threshold minimum and/or maximum distance, respectively, was reached. In other words, the computing system can train the system until a threshold similarity between a query and a relevant response is reached.

Figure 6:
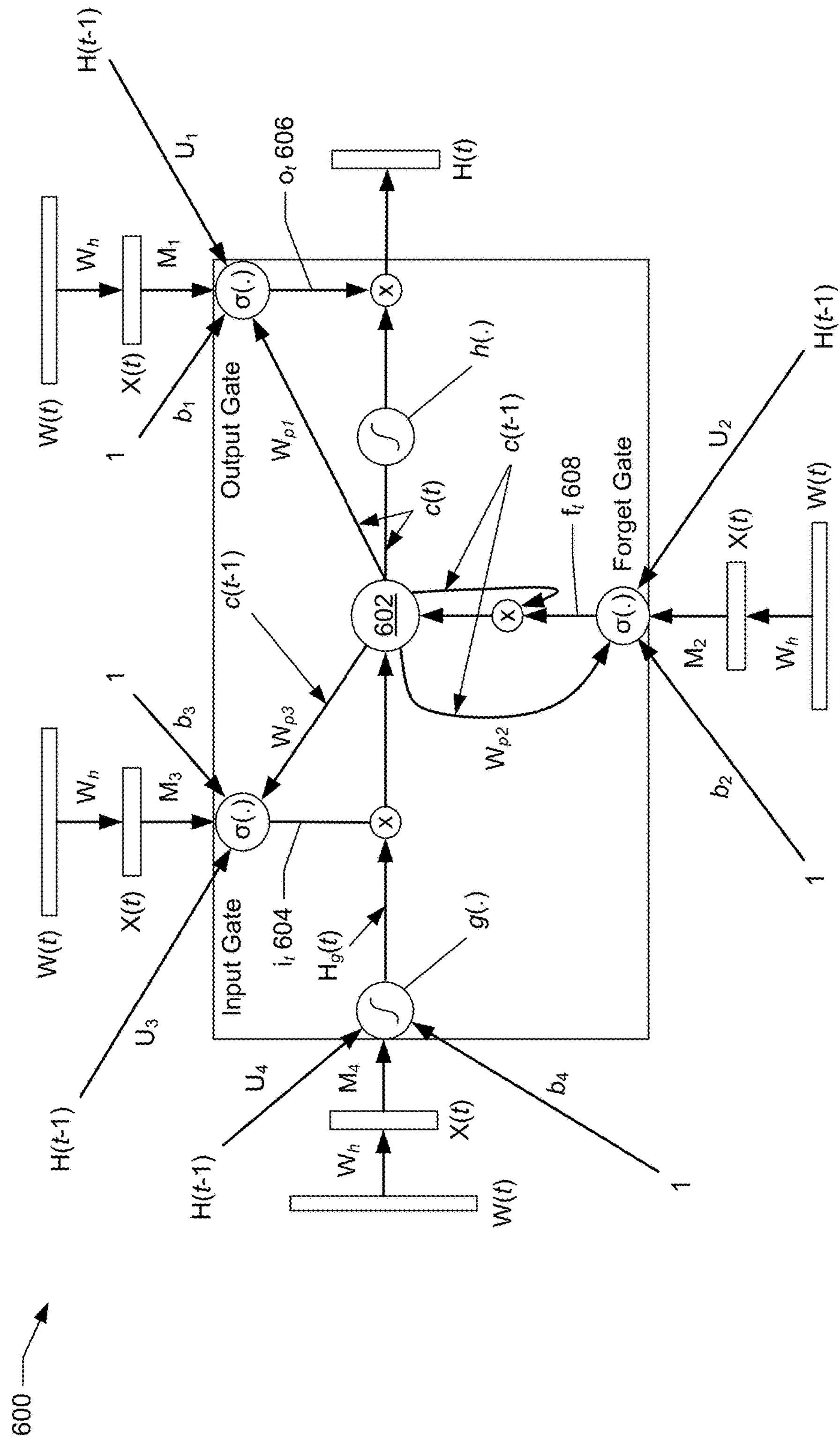
FIG. 6 is a dataflow diagram depicting an example architecture of a long short term memory cell used to train the semantically-relevant discovery of solution model.

FIG. 6 is a dataflow diagram depicting an example architecture of a long short term memory (LSTM) cell used to train a semantically-relevant discovery of solutions model. In various examples, the LSTM cell in an RNN-LSTM model can be used to replace the activation function (e.g., non-linear activation function) of the RNN described above.

In some examples, the LSTM architecture 600 can comprise a cell 602, an input gate $i_t$ 604, an output gate $o_t$ 606, and a forget gate $f_t$ 608. As depicted in FIG. 6, the cell state of the LSTM cell 602 can be represented as vector $c_t$.

In various examples, the gates can be trained to selectively pick what the cell 602 should remember, via input gate $i_t$ 604, pass on via the output gate $o_t$ 606, and forget via the forget gate $f_t$ 608. In some examples, the input gate $i_t$ 604, the output gate $o_t$ 606, and the forget gate $f_t$ 608 can each be trained by a respective neural network (e.g., non-linear transformation). In various examples, the training may be facilitated by applying the stochastic gradient descent (SGD) algorithm shown in TABLE 1 above. In other examples, the training may be facilitated by applying a different algorithm.

The input gate $i_t$ 604, the output gate $o_t$ 606, and the forget gate $f_t$ 608, may comprise respective parameters that are trained to give a desired result. In various examples, the input gate $i_t$ 604 parameter may evolve in such a way that it attenuates unimportant information from an input. In such examples, one or more of the input gate $i_t$ 604 parameter, the output gate $o_t$ 606 parameter, and the forget gate $f_t$ 608 parameter may reduce the effect of unimportant words in a final semantic representation H(t) of the input.

Additionally or alternatively, one or more of the input gate $i_t$ 604 parameter, the output gate $o_t$ 606 parameter, and the forget gate $f_t$ 608 parameter may be trained to detect and emphasize important information (e.g., keywords) in the input. The training of the parameters is described above with respect to FIG. 4.

In various examples, the LSTM cell 602 may comprise peephole connections, depicted in FIG. 4 as $W_{p1}$, $W_{p2}$ and $W_{p3}$. In such examples, the LSTM cell 602 may comprise a connection to a current cell state $c_t$. Additionally, the LSTM cell 602 may comprise input connections $W_i$, recurrent connections $W_{reci}$, and bias values $b_i$ for i=1, 2, 3, 4.

The LSTM architecture 600 may apply functions g(•), h(•), and σ(•) to various vectors. In various examples, g(•) and h(•) may comprise tan h(•) functions, and σ(•) may comprise a sigmoid function.

In various examples, the LSTM architecture 600 can be to find a value H for each word in an input, such as, for example, $H_0$ 312, $H_1$ 314, $H_2$ 316, $H_3$ 318 and $H_4$ 320 depicted in FIG. 3, where $H_4$ corresponds to the last word of the input, and represents the semantic representation of the entire input.

As illustrated in FIG. 6, the forward pass for an LSTM-RNN model can be represented as follows:

$$H_g(t)=g(M_4I_1(t)+U_4H(t-1)+b_4)$$

$$i(t)=\sigma(M_3X(t)+U_3H(t-1)+W_{p3}c(t-1)+b_3)$$

$$f(t)=\sigma(M_2X(t)+U_2H(t-1)+W_{p2}c(t-1)+b_2)$$

$$c(t)=f(t)\circ c(t-1)+i(t)\circ H_g(t)$$

$$o(t)=\sigma(M_1X(t)+U_1H(t-1)+W_{p1}c(t)+b_1)$$

$$H(t)=o(t)\circ h(c(t)),$$

where (○) denotes a Hadamard (element-wise) product.

Figure 7:
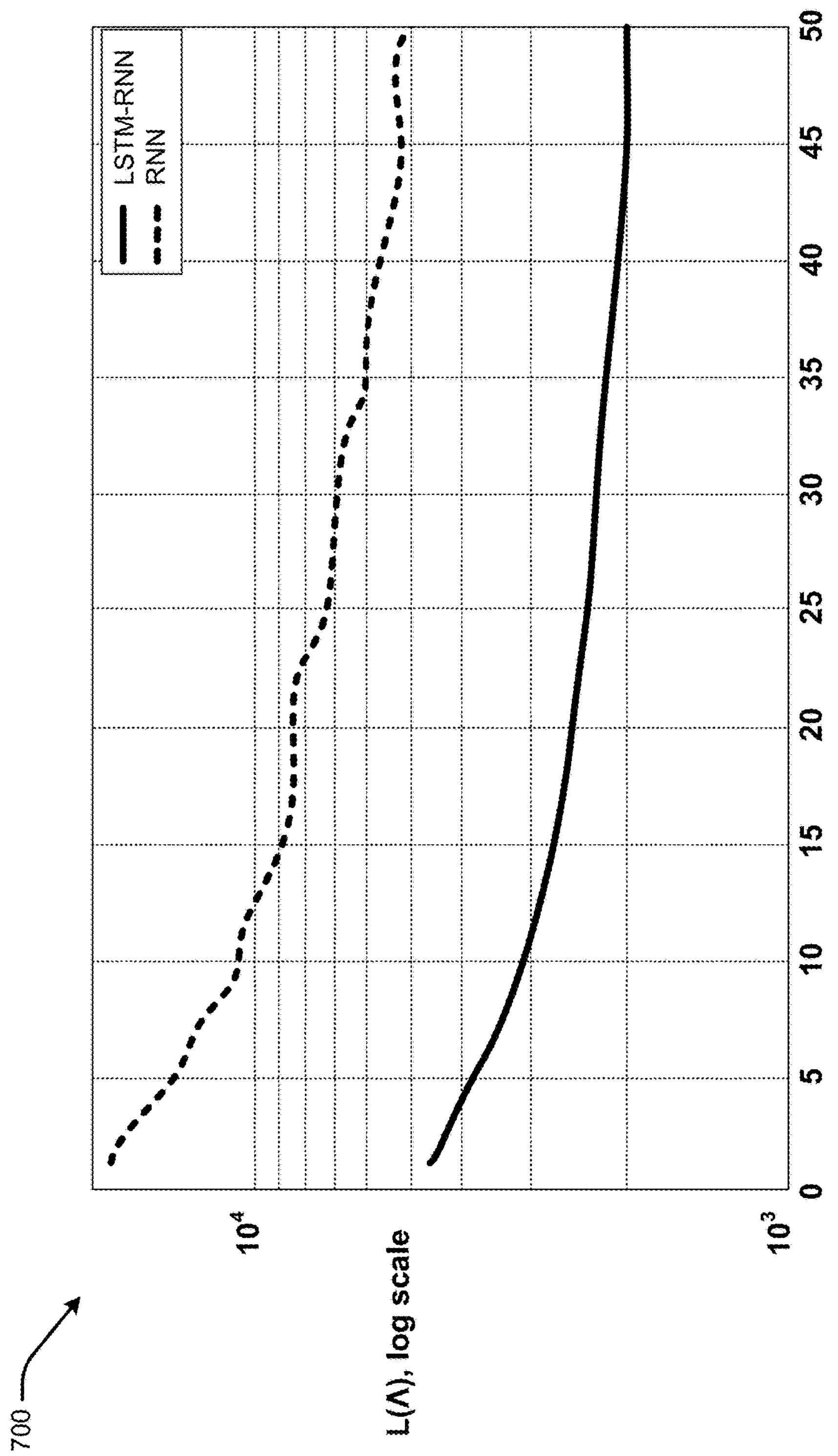
FIG. 7 is an illustrative representation of an example comparison between cost functions during training for a long short term memory recurrent neural network (LSTM-RNN) model and a recurrent neural network (RNN) model.

FIG. 7 is an illustrative representation of an example comparison between cost functions during training for a long short term memory recurrent neural network (LSTM-RNN) model and a recurrent neural network (RNN) model.

In various examples, the parameters associated with each of the LSTM-RNN and RNN can be initialized randomly.

In the illustrative example, the vertical axis represents a logarithmic scales of the training cost L(Λ) described above with respect to FIG. 4. The horizontal axis represents the number of epochs during training.

As illustrated in FIG. 7, the LSTM-RNN and RNN models can both optimize the cost function during training. In an example, the LSTM-RNN model can optimize the cost function over 50 epochs by approximately 60% from $4.8\times10^3$ to $2.0\times10^3$. Similarly, the RNN model can optimize the cost function over 50 epochs by approximately 70% from $1.8\times10^4$ to $5.0\times10^3$.

Illustrative Processes

Figure 8:
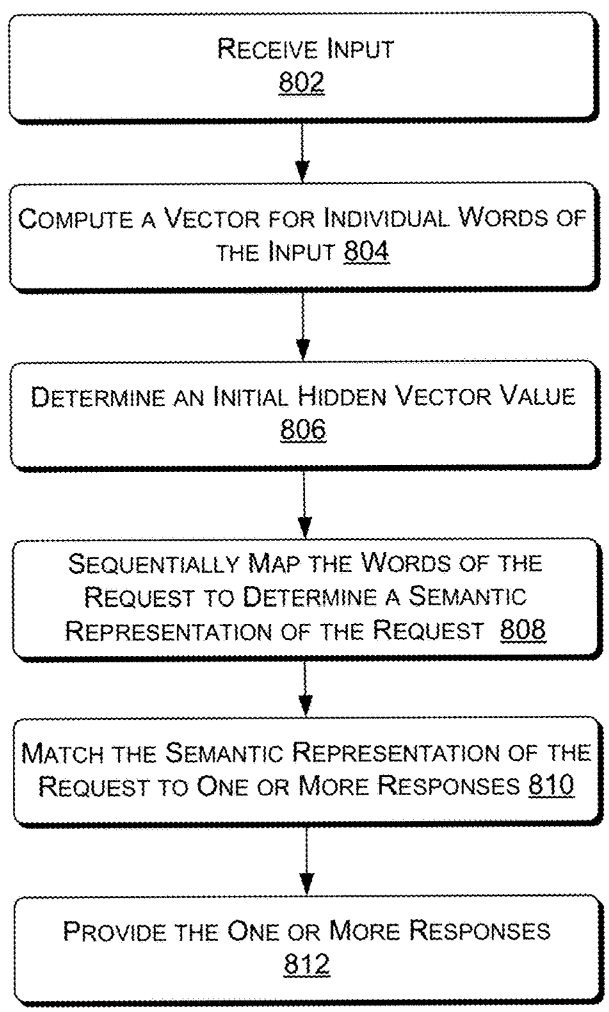
FIG. 8 is a flow diagram that illustrates a process flow of determining a semantic representation of an input.
Figure 9:
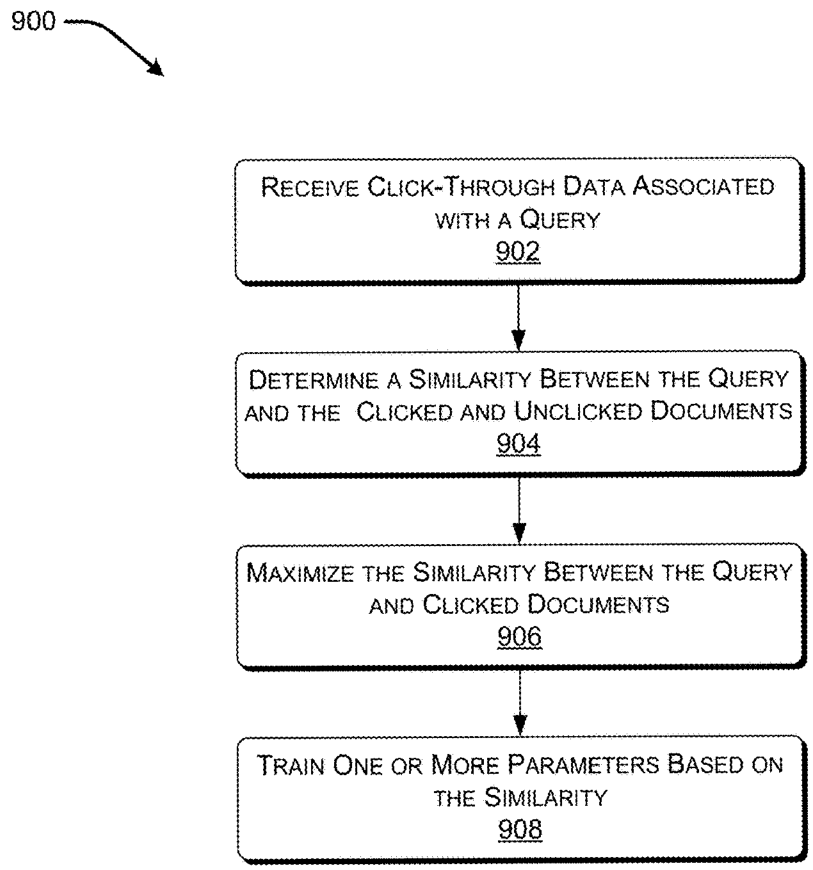
FIG. 9 is a flow diagram that illustrates a process flow of training one or more parameters of a system to provide semantically-relevant discovery of solutions.

FIGS. 8 and 9 are flow diagrams depicting example processes for an input/response semantic relevance optimization and training, respectively. The operations of the example process are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes.

FIG. 8 is a flow diagram that illustrates a process flow 800 of determining a semantic representation of an input (e.g., a query, question, request for information, etc.). Process 800 can be performed by resources associated with one or more devices 106 such as one or more processing unit(s) 108 and/or 202 (e.g., internal or external CPU, or GPU), and one or more pieces of hardware logic such as FPGAs, DSPs, or other types of accelerators.

At block 802, the computing system can receive an input from a user. The input can comprise a query, a question, a request for translation, or any other type of request for information. In various examples, the input can comprise less than ten words. In other examples, the input can comprise ten words or greater. In some examples, the input can be a string of words organized in the form of a sentence. In yet other examples, the input can comprise a disorganized string of words.

At block 804, the computing system can compute a vector for each word in the input. In various examples, the computing system can calculate the vector using a fixed hashing operator. In various examples, the resulting vector can comprise a relatively low dimensional letter trigram representation.

At block 806, the computing system can determine the value of an initial hidden vector, such as $H_0$ shown in FIG. 3.

At block 808, the computing system can sequentially map each word into a hidden vector. In various examples, the hidden vector can be a low dimensional vector. In at least one example, the sequential mapping can start at a left end of the input, and end at the right end of the input. In other examples, the sequential mapping can start at the right end of the input and end at the left end of the input. The computing system can determine the semantic representation of the input by sequentially mapping the words of the input, the semantic representation being the final hidden vector resulting from the mapping of the last word of the input.

In various examples, the mapping can comprise applying two or more parameters to a word and a previously calculated hidden vector. For example, in an RNN model, the computing system can apply a first parameter to the vector corresponding to the first word, and combine it with the value resulting from the application of a second parameter to the initial hidden vector $H_0$ to map $H_1$, the hidden vector corresponding to the second word of the input. The computing system can then apply the first parameter to the vector corresponding to the second word, and combine it with the value resulting from the application of the second parameter to $H_1$ to calculate $H_2$. The computing device can continue the iterative mapping of each word until it maps the final word in the input. The resulting hidden vector, $H_t$ can represent the semantic representation of the input.

For another example, in an RNN-LSTM model, the computing system can process each word sequentially through an LSTM cell to determine the resulting hidden vector. The LSTM cell can apply an input gate parameter, an output gate parameter, and a forget gate parameter during the mapping process. In such an example, the LSTM cell can attenuate unimportant words, and can emphasize keywords in the hidden vector mapping. As such, the resulting semantic representation may be of increased accuracy.

At block 810, the computing system can match the semantic representation of the input to one or more responses (e.g., documents, solutions, answers, etc.) comprising a substantially similar semantic representation.

At block 812, the computing system can provide the one or more responses to the input. In some examples, the computing system can provide the one or more responses in a ranked list. In such an example, the most semantically relevant responses may be ranked the highest.

In various examples, the computing system can generate the one or more responses and provide the one or more responses for presentation via a network interface and/or an I/O interface.

FIG. 9 is a flow diagram that illustrates a process flow 900 of training a model to optimize the discovery of semantically-relevant responses.

At block 902, the computing system can receive click-through data associated with a query. In various examples, the click-through data can comprise the query, and corresponding clicked and unclicked documents provided in response to the query. The clicked documents can represent documents that are relevant to a particular query, and unclicked documents can represent documents that are irrelevant to the particular query.

At block 904, the computing system can determine the similarity between the query and a clicked document and the similarity between the query and an unclicked document.

At block 906, the computing system can adjust one or more parameters to maximize the similarity between the query and the clicked documents. In various examples, the computing system can additionally adjust one or more parameters to minimize the similarity between the query and the unclicked documents. In some examples, the computing system may iteratively adjust the one or more parameters until the system recognizes a threshold similarity between the query and the relevant document and/or a threshold difference (e.g., dissimilarity) between the query and the irrelevant document.

At block 908, based at least in part on the maximizing the similarity at block 906, the computing system can train the one or more parameters to a value that maximizes similarity and/or minimizes dissimilarity, as described above. In various examples, the training of the one or more parameters may result in optimization of the system providing the discovery of semantically-relevant solutions.

Example Clauses

A: A system comprising: a processor; a computer-readable media including instructions for a semantic relevance framework, for actuation by the processor, the semantic relevance framework comprising: a mapping module including instructions to configure the processor to sequentially process one or more words of a query and determine a semantic representation of the query; and a matching module including instructions to configure the processor to identify one or more responses with corresponding semantic representations that are substantially similar to the semantic representation of the query.

B: A system as paragraph A describes, wherein the mapping module further includes instructions to configure the processor to determine an initial hidden vector, and the sequential processing of the one or more words further comprises: calculating an initial vector for each word of the one or more words of the query; applying a first parameter to a first initial vector to calculate a first vector, the first vector corresponding to a first word of the one or more words of the query; applying a second parameter to the initial hidden vector to calculate a first vector value; calculate a first hidden vector by combining the first vector and the first vector value; and iteratively processing each word of the one or more words to calculate a final hidden vector value.

C: A system as either paragraph A or paragraph B describes, further comprising: a ranking module including instructions to configure the processor to calculate a similarity between the semantic representations corresponding to the one or more responses and the semantic representation of the query; and rank the one or more responses based at least in part on the similarity.

D: A system as paragraphs A-C describe, further comprising: a display module including instructions to configure the processor to send the one or more responses to a user associated with the query.

E: A system as paragraphs A-D describe, further comprising: a machine learning module including instructions to configure the processor to: receive click-through data associated with one or more queries; train one or more parameters of the mapping module based at least in part on the click-through data; and apply the one or more trained parameters in the sequential processing of the one or more words of the query.

F: A system as paragraphs A-E describe, wherein the machine learning module comprises a long short term memory cell.

G: A system as paragraphs A-E describe, wherein the one or more parameters comprise one or more of: an input weight matrix; a recurrent weight matrix; an input gate parameter; an output gate parameter; and a forget gate parameter.

H: A system as paragraphs A-G describe, wherein the one or more responses comprise at least one of: a document related to the query; a solution to the query; or an answer to the query.

I: A computer-readable medium having thereon computer-executable instructions that responsive to execution configure a computer to perform a method as any one of paragraphs A-H describes.

J: A device or method comprising: a processor; and a computer-readable medium coupled to the processor, the computer-readable medium including instructions to configure one or more devices to perform a method as any of paragraphs A-H describes.

K: A device or method comprising: means for processing; and means for storing coupled to the means for processing, the means for storing, storing instructions to configure one or more devices to perform a method as any of paragraphs A-H describes.

L: A computer-implemented method, comprising: receiving a query comprising one or more words; computing a vector for individual words of the one or more words; determining an initial hidden vector; mapping the one or more words of the request, wherein the mapping is rendered sequentially; determining a semantic representation of the request; matching the semantic representation of the query to a semantic representation corresponding to one or more responses; and providing the one or more responses based at least in part on the matching.

M: A method as paragraph L describes, the sequential mapping further comprising: applying a first parameter to a first vector to calculate a new word value, the first vector corresponding to a first word; applying a second parameter to the initial hidden vector to calculate an initial hidden vector value; combining the new word value and the initial hidden vector value into a hidden vector.

N: A method as either paragraph L or paragraph M describes, further comprising: iteratively calculating the new word value and the initial hidden vector value for each word of the one or more words of the query.

O: A method as paragraph M describes, wherein: the first parameter is an input weight matrix; and the second parameter is a recurrent weight matrix.

P: A method as paragraphs L-O describe, further comprising: receiving click-through data associated with the one or more responses, the click-through data identifying a document of the one or more responses as a positive match; and training the mapping based at least in part on the click-through data.

Q: A method as paragraphs L-P describe, wherein the mapping is performed by a long short term memory (LSTM) cell comprising one or more of: an input gate; an output gate; and a forget gate.

R: A method as paragraphs L-Q describe, further comprising: prior to the matching, receiving a document of a plurality of responses, the document comprising one or more words; computing a vector for individual words of the one or more words of the document; determining an initial hidden vector for the document; sequentially mapping the one or more words of the document; and determining a semantic representation of the document.

S: A method as paragraphs L-R describe, wherein the one or more responses comprise at least one of: a document related to the query; a solution to the query; or an answer to the query.

T: A computer-readable medium having thereon computer-executable instructions that responsive to execution configure a computer to perform a method as any one of paragraphs L-S describes.

U: A device or system comprising: a processor; and a computer-readable medium coupled to the processor, the computer-readable medium including instructions to configure one or more devices to perform a method as any of paragraphs L-S describes.

V: A device or system comprising: means for processing; and means for storing coupled to the means for processing, the means for storing, storing instructions to configure one or more devices to perform a method as any of paragraphs L-S describes.

W: A computer-readable medium having thereon computer-executable instructions, the computer-executable instructions responsive to execution configuring a device to perform operations comprising: receiving a query comprising one or more words; computing a vector for individual words of the one or more words; determining an initial hidden vector; sequentially mapping the one or more words of the request; determining a semantic representation of the request; matching the semantic representation of the query to a semantic representation corresponding to one or more responses; and providing the one or more responses documents based at least in part on the matching.

X: A computer-readable medium as paragraph W describes, further comprising: applying a first parameter to a first vector to calculate a new word value, the first vector corresponding to a first word; applying a second parameter to the initial hidden vector to calculate an initial hidden vector value; combining the new word value and the initial hidden vector value into a hidden vector.

Y: A computer-readable medium as either paragraph W or paragraph X describe, further comprising: iteratively calculating the new word value and the initial hidden vector value for each word of the one or more words of the query.

Z: A computer-readable medium as paragraphs W-Y describe, further comprising: prior to the matching, receiving a document of a plurality of responses, the document comprising one or more words; computing a vector for individual words of the one or more words of the document; determining an initial hidden vector for the document; sequentially mapping the one or more words of the document; and determining a semantic representation of the document.

AA: A computer-readable medium as paragraphs W-Z describe, further comprising: receiving click-through data associated with the one or more responses, the click-through data identifying a document of the one or more responses documents as a positive match; and training the mapping based at least in part on the click-through data.

AB: A computer-readable medium as paragraphs W-AA describe, wherein the semantic representation of the request is determined using a long short term memory cell.

AC: A computer-readable medium as paragraphs W-AB describe, wherein the training comprises calculating a value for one or more of: an input weight matrix; a recurrent weight matrix; an input gate parameter; an output gate parameter; and a forget gate.

AD: A computer-readable medium as paragraphs W-AC describe, wherein the one or more responses comprise at least one of: a document related to the query; a solution to the query; or an answer to the query.

AE: A device or system comprising: a processor; and a computer-readable medium as any of paragraphs W-AD describes coupled to the processor.

AF: A device or system comprising: means for processing; and means for storing coupled to the means for processing, the means for storing, storing instructions to configure one or more devices to perform a method as any of paragraphs W-AD describes.

AG: A device comprising: a mapping module including instructions to configure the processor to sequentially process one or more words of a query and determine a semantic representation of the query; and a matching module including instructions to configure the processor to identify one or more responses with corresponding semantic representations that are substantially similar to the semantic representation of the query.

AH: device as paragraph AG describes, wherein the mapping module further includes instructions to configure the processor to determine an initial hidden vector, and the sequential processing of the one or more words further comprises: calculating a vector for each word of the one or more words of the query; applying a first parameter to a first vector to calculate a first vector, the first vector corresponding to a first word of the one or more words of the query; applying a second parameter to the initial hidden vector to calculate a first vector value; calculate a first hidden vector by combining the first vector and the first vector value; and iteratively processing each word of the one or more words to calculate a final hidden vector value.

AI: A device as either paragraph AG or paragraph AH describes, further comprising: a ranking module including instructions to configure the processor to calculate a similarity between the semantic representations corresponding to the one or more responses and the semantic representation of the query; and rank the one or more responses based at least in part on the similarity.

AJ: A device as paragraphs AG-AI describe, further comprising: a display module including instructions to configure the processor to send the one or more responses to a user associated with the query.

AK: A device as paragraphs AG-AJ describe, further comprising: a machine learning module including instructions to configure the processor to: receive click-through data associated with one or more queries; train one or more parameters of the mapping module based at least in part on the click-through data; and apply the one or more trained parameters in the sequential processing of the one or more words of the query.

AL: A device as paragraphs AG-AK describe, wherein the machine learning module comprises a long short term memory cell.

AM: A device as paragraphs AG-AK describe, wherein the one or more parameters comprise one or more of: an input weight matrix; a recurrent weight matrix; an input gate parameter; an output gate parameter; and a forget gate parameter.

AN: A device as paragraphs AG-AM describe, wherein the one or more responses comprise at least one of: a document related to the query; a solution to the query; or an answer to the query.

AO: A computer-readable medium having thereon computer-executable instructions that responsive to execution configure a computer to perform a method as any one of paragraphs AG-AN describes.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing device(s) 106, 124, or 200 such as one or more internal or external CPUs or GPUs, and/or one or more pieces of hardware logic such as FPGAs, DSPs, or other types described above.

All of the methods and processes described above can be embodied in, and fully automated via, software code modules executed by one or more general purpose computers or processors. The code modules can be stored in any type of computer-readable storage medium or other computer storage device. Some or all of the methods can be embodied in specialized computer hardware.

Conditional language such as, among others, "can," "could," "might" or "may," unless specifically stated otherwise, are otherwise understood within the context as used in general to present that certain examples include, while other examples do not include, certain features, elements and/or steps. Thus, such conditional language is not generally intended to imply that features, elements and/or steps are in any way required for one or more examples or that one or more examples necessarily include logic for deciding, with or without user input or prompting, whether these features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate examples are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
a memory storing instructions which, when executed by one or more processors, cause the one or more processors to perform operation comprising:
receiving a query comprising one or more words;
computing a vector for individual words of the one or more words;
determining an initial hidden vector corresponding to a semantic representation of the query;
mapping, using mapping software, the one or more words of the query based on the initial hidden vector, wherein the mapping is rendered sequentially;
matching the semantic representation of the query, represented in the initial hidden vector, to a semantic representation corresponding to one or more responses;
providing, in a user interface, the one or more responses based at least in part on the matching, the user interface indicating a semantic similarity between the query and the one or more responses;
receiving click-through data associated with the one or more responses, the click-through data identifying a response from among the one or more responses as a positive match; and
training the mapping software based at least in part on the click-through data.

2. The system of claim 1, the operations further comprising:
determining an initial hidden vector, and wherein mapping the one or more words of the query comprises:
calculating an initial vector for each word of the one or more words of the query;
applying a first parameter to a first initial vector to calculate a first vector, the first vector corresponding to a first word of the one or more words of the query;
applying a second parameter to the initial hidden vector to calculate a first vector value;
calculate a first hidden vector by combining the first vector and the first vector value; and
iteratively processing each word of the one or more words to calculate a final hidden vector value.

3. The system of claim 1, the operations further comprising:
calculating a similarity between the semantic representations corresponding to the one or more responses and the semantic representation of the query; and
ranking the one or more responses based at least in part on the similarity.

4. The system of claim 1, the operations further comprising:
sending the one or more responses to a user associated with the query.

5. The system of claim 1, wherein the mapping software comprises a long short term memory cell.

6. The system of claim 1, wherein the mapping software is trained with one or more parameters, and wherein the one or more parameters comprise one or more of:
an input weight matrix;
a recurrent weight matrix;
an input gate parameter;
an output gate parameter; and
a forget gate parameter.

7. The system of claim 1, wherein the one or more responses comprise at least one of:
a document related to the query;
a solution to the query; or
an answer to the query.

8. A computer-implemented method comprising:
receiving a query comprising one or more words;
computing a vector for individual words of the one or more words;
determining an initial hidden vector corresponding to a semantic representation of the query;
mapping, using mapping software, the one or more words of the query based on the initial hidden vector, wherein the mapping is rendered sequentially;
matching the semantic representation of the query, represented in the initial hidden vector, to a semantic representation corresponding to one or more responses;
providing, in a user interface, the one or more responses based at least in part on the matching, the user interface indicating a semantic similarity between the query and the one or more responses;
receiving click-through data associated with the one or more responses, the click-through data identifying a response from among the one or more responses as a positive match; and
training the mapping software based at least in part on the click-through data.

9. The method of claim 8, the sequential mapping further comprising:
applying a first parameter to a first vector to calculate a new word value, the first vector corresponding to a first word;
applying a second parameter to the initial hidden vector to calculate an initial hidden vector value;
combining the new word value and the initial hidden vector value into a hidden vector.

10. The method of claim 9, further comprising:
iteratively calculating the new word value and the initial hidden vector value for each word of the one or more words of the query.

11. The method of claim 9, wherein:
the first parameter is an input weight matrix; and
the second parameter is a recurrent weight matrix.

12. The method of claim 8, wherein the mapping is performed by a long short term memory (LSTM) cell comprising one or more of:
an input gate;
an output gate; and
a forget gate.

13. The method of claim 8, further comprising:

prior to the matching, receiving a document of a plurality of responses, the document comprising one or more words;

computing a vector for individual words of the one or more words of the document;

determining an initial hidden vector for the document;

sequentially mapping the one or more words of the document; and determining a semantic representation of the document.

14. A non-transitory computer-readable medium storing instructions which, when executed by one or more machines, cause the one or more machines to perform operation comprising:

receiving a query comprising one or more words;

computing a vector for individual words of the one or more words;

determining an initial hidden vector corresponding to a semantic representation of the query;

sequentially mapping, using mapping software, the one or more words of the query based on the initial hidden vector;

matching the semantic representation of the query, represented in the initial hidden vector, to a semantic representation corresponding to one or more responses;

providing, in a user interface, the one or more responses based at least in part on the matching, the user interface indicating a semantic similarity between the query and the one or more responses;

receiving click-through data associated with the one or more responses, the click-through data identifying a response from among the one or more responses as a positive match; and training the mapping software based at least in part on the click-through data.

15. The non-transitory computer-readable medium of claim 14, the operations further comprising:

applying a first parameter to a first vector to calculate a new word value, the first vector corresponding to a first word;

applying a second parameter to the initial hidden vector to calculate an initial hidden vector value;

combining the new word value and the initial hidden vector value into a hidden vector.

16. The non-transitory computer-readable medium of claim 14, the operations further comprising:

iteratively calculating the new word value and the initial hidden vector value for each word of the one or more words of the query.

17. The non-transitory computer-readable medium of claim 14, the operations further comprising:

prior to the matching, receiving a document of a plurality of responses, the document comprising one or more words;

computing a vector for individual words of the one or more words of the document;

determining an initial hidden vector for the document;

sequentially mapping the one or more words of the document; and determining a semantic representation of the document.

18. The non-transitory computer-readable medium of claim 14, the operations further comprising:

receiving click-through data associated with the one or more responses, the click-through data identifying a document of the one or more responses as a positive match; and training the mapping based at least in part on the click-through data.

* * * * *